US012800003B2

(12) United States Patent
Leonard et al.

(10) Patent No.: US 12,800,003 B2
(45) Date of Patent: Nov. 17, 2026

(54) GAS SPRING AND GAS DAMPER ASSEMBLIES WITH EXTERNAL MOUNTING MEMBER AND SUSPENSION SYSTEM INCLUDING SAME

(71) Applicant: Firestone Industrial Products Company, LLC, Nashville, TN (US)

(72) Inventors: Joshua R. Leonard, Noblesville, IN (US); Edger Ten Broeke, Sinderen (NL)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 19/482,745

(22) PCT Filed: May 9, 2024

(86) PCT No.: PCT/US2024/028565

§ 371 (c)(1),
(2) Date: Nov. 8, 2025

(87) PCT Pub. No.: WO2024/233772

PCT Pub. Date: Nov. 14, 2024

(65) Prior Publication Data

US 2026/0117836 A1 Apr. 30, 2026

Related U.S. Application Data

(60) Provisional application No. 63/501,395, filed on May 10, 2023.

(51) Int. Cl.
*F16F 9/05* (2006.01)
*B60G 11/27* (2006.01)
(Continued)

(52) U.S. Cl.
CPC .............. *F16F 9/057* (2013.01); *B60G 11/27* (2013.01); *B60G 11/28* (2013.01); *B60G 13/10* (2013.01);
(Continued)

(58) Field of Classification Search
CPC ...... F16F 9/04; F16F 9/05; F16F 9/057; F16F 9/02; F16F 9/049; F16F 9/0472;
(Continued)

(56) References Cited

U.S. PATENT DOCUMENTS 2,742,301 A * 4/1956 Pointer .................... B60G 5/04 188/176
3,246,905 A * 4/1966 Morgan ............... B60G 17/002 267/64.21
(Continued)

FOREIGN PATENT DOCUMENTS

CN 111306233 A * 6/2020 ................ F16F 9/04
CN 216300699 U 4/2022
(Continued)

OTHER PUBLICATIONS

International Search Report and Written Opinion dated Aug. 20, 2024 issued by EPO in connection with corresponding International Application No. PCT/US2024/028565.

*Primary Examiner* — Keith J Frisby

(57) ABSTRACT

Assemblies include a gas spring and gas damper assembly and a mounting member with an elongated passage extending therethrough. The gas spring and gas damper assembly includes a flexible spring and first and second end member assemblies. The second end member assembly includes an end member chamber as well as a first passage in fluid communication between a spring chamber and the end member chamber. The second end member assembly includes a second passage in fluid communication between the spring chamber and an external connection port. The
(Continued)

mounting member is secured to the second end member such that the elongated passage of the mounting member is in fluid communication with the second passage through the external connection port. Suspension systems are also included.

20 Claims, 16 Drawing Sheets

(51) Int. Cl.

| | |
|---|---|
| ***B60G 11/28*** | (2006.01) |
| ***B60G 13/10*** | (2006.01) |
| ***B60G 15/12*** | (2006.01) |
| ***B60G 17/048*** | (2006.01) |
| ***B60G 17/052*** | (2006.01) |
| ***B60G 17/08*** | (2006.01) |
| ***F16F 9/04*** | (2006.01) |

(52) U.S. Cl.

CPC ......... *B60G 15/12* (2013.01); *B60G 17/0485* (2013.01); *B60G 17/08* (2013.01); *F16F 9/0472* (2013.01); *F16F 9/049* (2013.01); *F16F 9/055* (2013.01); *B60G 17/0521* (2013.01); *B60G 2202/152* (2013.01); *B60G 2202/242* (2013.01); *B60G 2202/30* (2013.01); *B60G 2204/126* (2013.01); *B60G 2204/128* (2013.01); *B60G 2204/62* (2013.01); *B60G 2206/41* (2013.01); *B60G 2206/42* (2013.01); *B60G 2300/026* (2013.01); *B60G 2500/10* (2013.01); *B60G 2500/201* (2013.01); *B60G 2800/162* (2013.01); *B60G 2800/916* (2013.01); *F16F 2222/126* (2013.01); *F16F 2230/0005* (2013.01); *F16F 2230/06* (2013.01); *F16F 2232/08* (2013.01); *F16F 2238/02* (2013.01); *F16F 2238/04* (2013.01)

(58) Field of Classification Search

CPC ........ F16F 9/055; F16F 9/3207; F16F 9/3235; F16F 9/3242; F16F 9/348; F16F 9/3484; F16F 9/32; F16F 2222/126; F16F 2230/0005; F16F 2230/06; F16F 2232/08; F16F 2238/00; F16F 2238/02; F16F 2238/04; F16F 15/022; B60G 15/12; B60G 15/08; B60G 15/10; B60G 17/052; B60G 17/0521; B60G 17/0485; B60G 17/08; B60G 2202/152; B60G 2202/242; B60G 2202/30; B60G 2202/32; B60G 2204/126; B60G 2204/62; B60G 2204/1262; B60G 2204/128; B60G 2206/42; B60G 2206/424; B60G 2206/40; B60G 2206/41; B60G 2500/201; B60G 2500/10; B60G 2800/162; B60G 2800/916; B60G 11/27; B60G 11/28; B60G 2300/026; B60G 2300/0262; B60G 2300/02; B60G 13/06; B60G 13/10

USPC .......... 280/124.157, 124.16, 161; 267/64.27, 267/122, 64.23, 64.19

See application file for complete search history.

(56) References Cited

U.S. PATENT DOCUMENTS

| | | | | |
|---|---|---|---|---|
| 5,111,735 | A | 5/1992 | Johnson | |
| 6,691,989 | B1 * | 2/2004 | Leonard | B60G 17/0521 267/64.19 |
| 9,545,933 | B2 * | 1/2017 | Nishimura | F16F 13/002 |
| 2008/0284072 | A1 * | 11/2008 | Hayes | F16F 9/049 267/119 |
| 2014/0345450 | A1 | 11/2014 | Leonard et al. | |
| 2015/0130146 | A1 * | 5/2015 | Moulik | B60G 15/12 280/124.16 |
| 2015/0217617 | A1 * | 8/2015 | Leonard | F16F 13/06 280/124.16 |
| 2016/0101663 | A1 * | 4/2016 | Leonard | F16F 9/084 267/64.24 |
| 2016/0236532 | A1 * | 8/2016 | Moulik | B60G 15/12 |
| 2016/0332497 | A1 * | 11/2016 | Keeler | F16F 9/057 |
| 2017/0151848 | A1 * | 6/2017 | Delorenzis | F16F 9/049 |
| 2017/0241504 | A1 * | 8/2017 | Delorenzis | F16K 3/03 |
| 2017/0363169 | A1 * | 12/2017 | Bounds | F16F 9/34 |
| 2018/0093542 | A1 * | 4/2018 | Leonard | F16F 9/049 |
| 2018/0147906 | A1 * | 5/2018 | Leonard | B60G 11/27 |
| 2018/0187739 | A1 * | 7/2018 | Leonard | F16F 9/365 |
| 2018/0297431 | A1 * | 10/2018 | Leonard | B60G 11/27 |
| 2019/0337346 | A1 * | 11/2019 | Delorenzis | B60G 9/003 |
| 2021/0262545 | A1 * | 8/2021 | ten Broeke | F16F 9/05 |
| 2023/0311603 | A1 * | 10/2023 | ten Broeke | F16F 9/057 267/64.24 |
| 2024/0166012 | A1 * | 5/2024 | Khajepour | B60G 11/27 |

FOREIGN PATENT DOCUMENTS

| | | | | | |
|---|---|---|---|---|---|
| CN | 114838079 | A | * | 8/2022 | F16F 9/34 |
| CN | 218000249 | U | * | 12/2022 | |
| CN | 116658556 | A | | 8/2023 | |
| DE | 10236130 | C1 | * | 10/2003 | B60G 17/0521 |
| DE | 102010045563 | B4 | * | 2/2016 | F16F 9/0472 |
| EP | 2844505 | B1 | * | 5/2019 | B60G 11/27 |
| EP | 2710276 | B1 | * | 7/2025 | F16F 9/057 |
| JP | H0577638 | U | * | 10/1993 | B60G 17/0521 |
| JP | 08014299 | A | * | 1/1996 | |
| RU | 109698 | U1 | | 10/2011 | |
| WO | WO-2021247514 | A1 | | 12/2021 | |

* cited by examiner

GAS SPRING AND GAS DAMPER ASSEMBLIES WITH EXTERNAL MOUNTING MEMBER AND SUSPENSION SYSTEM INCLUDING SAME

This application is the National Stage of International Application No. PCT/US2024/028565, filed on May 9, 2024, which claims the benefit of priority from U.S. Provisional Patent Application No. 63/501,395, filed on May 10, 2023, the entire contents of which is hereby incorporated herein by reference.

BACKGROUND

The subject matter of the present disclosure broadly relates to the art of gas spring devices and, more particularly, to gas spring and gas damper assemblies with external mounting members in fluid communication with the spring chamber and one or more external volumes. Suspension systems including one or more of such gas spring and gas damper assemblies are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In many applications involving vehicle suspension systems, it may be desirable to utilize spring elements that have as low of a spring rate as is practical, as the use of lower spring rate elements can provide improved ride quality and comfort compared to spring elements having higher spring rates. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of road inputs into the sprung mass and will, thus, provide a more comfortable ride.

Generally, it is possible to reduce the spring rate of gas springs, thereby improving ride comfort, by increasing the volume of pressurized gas operatively associated with the gas spring. This is commonly done by placing an additional chamber, cavity or volume filled with pressurized gas into fluid communication with the primary spring chamber of the gas spring.

The one or more damping elements can, in some cases, be of a type and kind that utilize gaseous fluid rather than liquid as the working medium. In known constructions, the pressurized gas damping element can permit gas flow between two or more volumes of pressurized gas, such as through one or more orifices or through one or more valve ports. Generally, there is some resistance to the movement of pressurized gas through these passages or ports. This resistance acts to dissipate energy associated with gas springs and/or suspension systems, and thereby provide some measure of damping.

However, various disadvantages exist with known gas spring constructions that include additional gas volumes to assist in reducing the spring rate of the gas spring, and at least some of these disadvantages involve the movement of air between the two volumes. That is, the flow of pressurized gas between the two volumes is at least partially dependent upon the size, length, shape and number of fluid pathways connecting the two volumes. It will be appreciated that one or more, very large, fluid-communication pathways would permit increased quantities of pressurized gas to flow between the two volumes. However, such pathways would provide reduced resistance to gas flow and, thus, provide minimal or at least decreased damping characteristics. What's more, such very large pathways are often difficult to provide, given the limited operating and mounting envelopes normally associated with vehicle suspension systems.

Increased damping performance can, in some cases, be achieved by reducing the size, increasing the length, altering the shape and/or reducing the number of fluid pathways between the two volumes. Such alterations would, however, normally provide increased damping performance at the expense of other performance characteristics of the gas spring assemblies. That is, the changes that increase the resistance to flow through the passages and, thus, increase damping performance will typically also decrease the effectiveness of the additional gas volume in reducing the spring rate of the gas spring.

Notwithstanding the overall success of known constructions, certain disadvantages may still exist that could be limiting to broader adoption and/or use of gas spring devices. Accordingly, it is believed desirable to develop gas spring devices that overcome the foregoing and/or other problems or disadvantages of known designs, and/or otherwise advance the art of gas spring devices.

BRIEF DESCRIPTION

One example of an assembly in accordance with the subject matter of the present disclosure can include a gas spring and gas damper assembly that can include a flexible spring member having a longitudinal axis. The flexible spring member can extend peripherally about the longitudinal axis between a first end and a second end that is spaced longitudinally from the first end such that a spring chamber is at least partially defined therebetween. A first end member assembly can be secured across the first end of the flexible spring member such that a substantially fluid-tight connection is formed therebetween. A second end member can be secured across the second end of the flexible spring member such that a substantially fluid-tight connection is formed therebetween. The second end member assembly can at least partially define an end member chamber. The second end member assembly can include a first passage in fluid communication between the spring chamber and the end member chamber. The second end member assembly can also include a second passage in fluid communication between the spring chamber and an external connection port with the second passage and external connection port fluidically isolated from the end member chamber. The assembly can also include a mounting member with a first member end and a second member end. The first member end of the mounting member can be operatively attached to the second end member. The second end can be dimensioned for securement to an associated suspension component that includes an associated suspension component volume. The mounting member can include an elongated mounting member passage extending therethrough from a first member passage end accessible from along the first member end to a second member passage end accessible from along the second end member end. The mounting member can be sealingly engaged with the second end member such that a substantially fluid-tight connection is formed between at least the first member passage end of the elongated mounting member passage and the external connection port of the second end member. In such an arrangement, the spring chamber can be disposed in fluid communication with the associated suspension component volume through the second passage of the second end member and the elongated mounting member passage of the mounting member.

One example of a suspension system in accordance with the subject matter of the present disclosure can include a suspension component including a suspension component volume. At least one assembly according to the foregoing paragraph can have the mounting member secured to the suspension component. The second member end of the elongated mounting member passage can be disposed in fluid communication with the structural component volume.

Another example of a suspension system in accordance with the subject matter of the present disclosure can include a pressurized gas system including a pressurized gas source and a control device in fluid communication with the pressurized gas source. At least one assembly according to the foregoing paragraph can include at least the gas spring and gas damper assembly being disposed in fluid communication with the pressurized gas source through the control device.

DETAILED DESCRIPTION

Turning now to the drawings, it is to be understood that the showings are for purposes of illustrating examples of the subject matter of the present disclosure and that the examples shown and described herein are not intended to be limiting. Additionally, it will be appreciated that the drawings are not to scale and that portions of certain features and/or elements may be exaggerated for purpose of clarity and/or ease of understanding.

Figure 1:
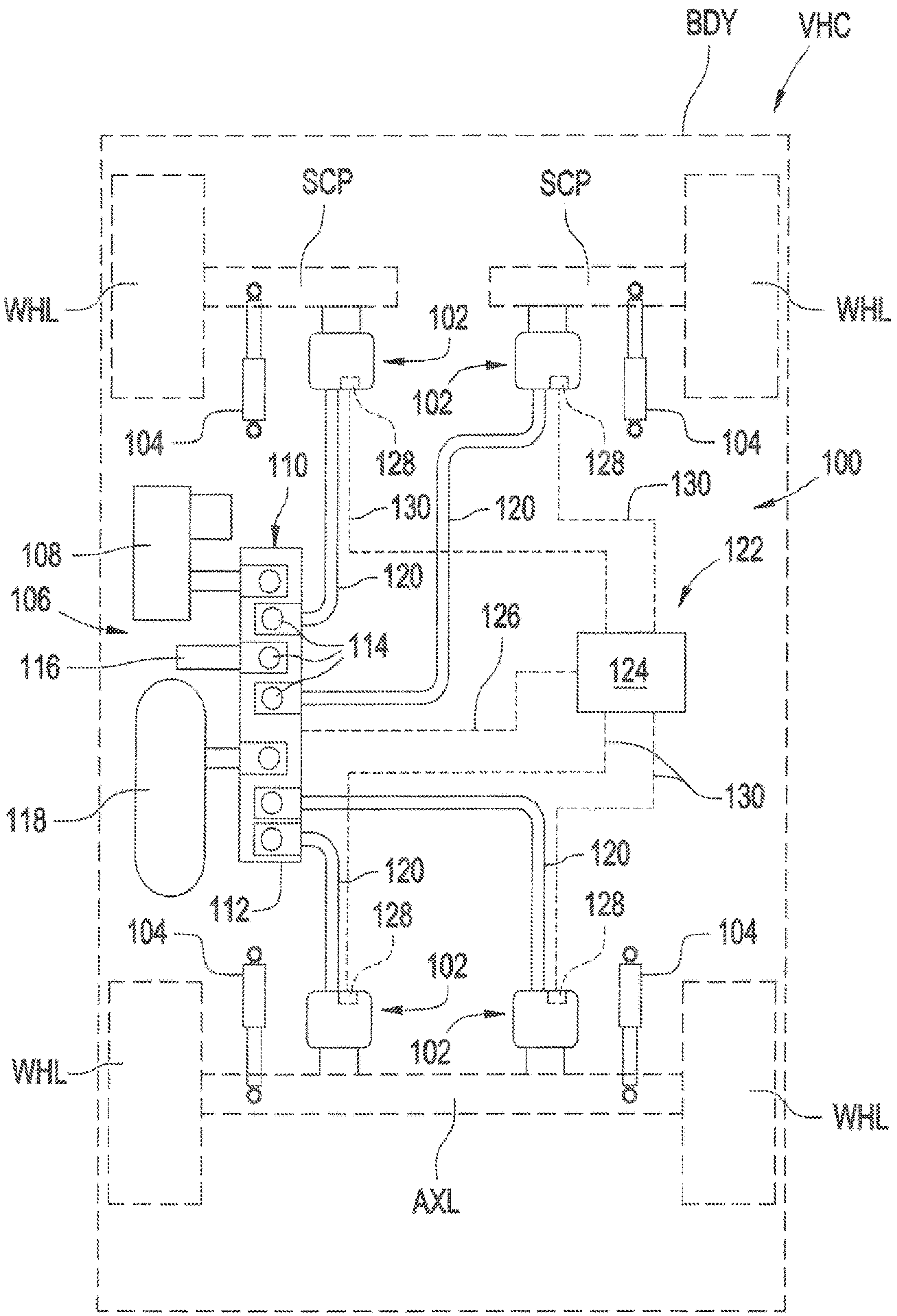
FIG. 1 is a schematic representation of one example of a suspension system that includes a plurality of gas spring and gas damper assemblies in accordance with the subject matter of the present disclosure.

FIG. 1 illustrates one example of a suspension system 100 operatively disposed between a sprung mass, such as an associated vehicle body BDY, for example, and an unsprung mass, such as associated wheels WHL, associated axles AXL and/or associated suspension components SCP, for example, of an associated vehicle VHC. It will be appreciated that any one or more of the components of the suspension system can be operatively connected between the sprung and unsprung masses of the associated vehicle in any suitable manner. The suspension system includes one or more gas spring and gas damper assemblies in accordance with the subject matter of the present disclosure as well as one or more damper assemblies that are operatively connected between the sprung and unsprung masses and together permit the sprung and unsprung masses of the associated vehicle to move in a somewhat controlled manner relative to one another, as discussed above.

As shown in FIG. 1, suspension system 100 can include a plurality of gas spring and gas damper assemblies 102 in accordance with the subject matter of the present disclosure, which may be alternately referred to herein simply as gas spring assemblies. Gas spring and gas damper assemblies 102 are operatively connected between the sprung and unsprung masses of the vehicle. Additionally, suspension system 100 can, optionally, include a plurality of damper assemblies 104 that are operatively connected between the sprung and unsprung masses of the vehicle. Depending on desired performance characteristics and/or other factors, the suspension system can include any suitable number and/or arrangement of one or more gas spring and gas damper assemblies and zero or more damper assemblies. For example, suspension system 100 in FIG. 1 includes four gas spring and gas damper assemblies 102 and four damper assemblies 104 with one of the gas spring and gas damper assemblies and one of the damper assemblies disposed toward each corner of the associated vehicle adjacent a corresponding one of associated wheels WHL. It will be appreciated, however, that other configurations and/or arrangements can alternately be used without departing from the subject matter of the present disclosure. That is, in some cases, gas spring and gas damper assemblies in accordance with the subject matter of the present disclosure (e.g., gas spring and gas damper assemblies 102) can be capable of providing pressurized gas damping, and can be sized, configured and operative to provide the desired performance characteristics for the suspension system without the use of additional damping members (e.g., conventional struts or shock absorbers) that are separately provided.

Suspension system 100 also includes a pressurized gas system 106 operatively associated with at least gas spring and gas damper assemblies 102 for selectively supplying pressurized gas (e.g., air) thereto and selectively transferring pressurized gas therefrom. In the exemplary arrangement shown in FIG. 1, pressurized gas system 106 includes a pressurized gas source, such as a compressor 108, for example, for generating pressurized air or other gases. A control device, such as a valve assembly 110, for example, is shown as being in communication with compressor 108 and can be of any suitable configuration or arrangement. In the exemplary embodiment shown, valve assembly 110 includes a valve block 112 with a plurality of valves 114 supported thereon. Valve assembly 110 can also, optionally, include a suitable exhaust, such as a muffler 116, for example, for venting pressurized gas from the system. Optionally, pressurized gas system 106 can also include a reservoir 118 in fluid communication with the compressor and/or valve assembly 110 and suitable for storing pressurized gas for an extended period of time (e.g., seconds, minutes, hours, weeks, days, months).

Valve assembly 110 is in communication with gas spring and gas damper assemblies 102 through suitable gas transfer lines 120. As such, pressurized gas can be selectively transferred into and/or out of the gas spring and gas damper assemblies through valve assembly 110 by selectively operating valves 114, such as to alter or maintain vehicle height at one or more corners of the vehicle, for example.

Suspension system 100 can also include a control system 122 that is capable of communication with any one or more systems and/or components of vehicle VHC and/or suspension system 100, such as for selective operation and/or control thereof. Control system 122 can include a controller or electronic control unit (ECU) 124 communicatively coupled with compressor 108 and/or valve assembly 110, such as through a conductor or lead 126, for example, for selective operation and control thereof, which can include supplying and exhausting pressurized gas to and/or from gas spring and gas damper assemblies 102. Controller 124 can be of any suitable type, kind and/or configuration.

Control system 122 can also, optionally, include one or more sensing devices 128, such as, for example, may be operatively associated with gas spring and gas damper assemblies 102 and capable of outputting or otherwise generating data, signals and/or other communications having a relation to one or more of: a height of the gas spring and gas damper assemblies; a distance between other components of the vehicle; a pressure or temperature having a relation to the gas spring and gas damper assemblies and/or a wheel or tire or other component associated with the gas spring and gas damper assemblies; and/or an acceleration, load or other input acting on the gas spring and gas damper assemblies. Sensing devices 128 can be in communication with ECU 124, which can receive the data, signals and/or other communications therefrom. The sensing devices can be in communication with ECU 124 in any suitable manner, such as through conductors or leads 130, for example. Additionally, it will be appreciated that the sensing devices can be of any suitable type, kind and/or construction and can operate using any suitable combination of one or more operating principles and/or techniques.

Having described an example of a suspension system (e.g., suspension system 100) that can include gas spring and gas damper assemblies in accordance with the subject matter of the present disclosure (e.g., gas spring and gas damper assemblies 102), one example of such a gas spring and gas damper assembly will now be described in connection with FIGS. 2-11. As shown therein, a gas spring and gas damper assembly AS1 (which, in some cases, may be alternately referred to herein simply as a gas spring assembly), such as may be suitable for use as one or more of assemblies 102 in FIG. 1, for example, is shown as having a longitudinal axis AX (FIG. 4) and including a flexible spring member (or flexible annular member) 200. Gas spring and gas damper assembly AS1 also includes an end member (or end member assembly) 300 that is secured on or along the flexible spring member such that a substantially fluid-tight connection is formed therebetween. The gas spring and gas damper assembly also includes an end member (or end member assembly) 400 that is operatively connected to flexible spring member 200 opposite end member assembly 300, such as by way of an end closure (or end closure assembly) 500, for example. Flexible spring member 200 can be secured on or along the end member assemblies in a substantially fluid-tight manner such that a spring chamber 202 (FIGS. 6-8, 1, 11 and 16) is at least partially defined by the flexible spring member between end member assembly 300, end member assembly 400, and/or end closure assembly 500.

It will be appreciated that flexible spring member 200 can be of any suitable size, shape, construction and/or configuration. Additionally, the flexible spring member can be of any type and/or kind, such as a rolling lobe-type or convoluted bellows-type construction, for example. Flexible spring member 200 is shown herein as including a flexible wall 204 that can be formed in any suitable manner and from any suitable material or combination of materials. For example, the flexible wall can include one or more fabric-reinforced, elastomeric plies or layers and/or one or more un-reinforced, elastomeric plies or layers. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 204 can extend peripherally around longitudinal axis AX and can extend in a generally longitudinal direction between opposing ends 206 and 208. Additionally, flexible wall 204 can include an outer surface 210 and an inner surface 212. The inner surface can at least partially define spring chamber 202 of gas spring and gas damper assembly AS1. Flexible wall 204 can include an outer or cover ply (not identified) that at least partially forms outer surface 210, and can also include an inner or liner ply (not identified) that at least partially forms inner surface 212. In some cases, flexible wall 204 can further include one or more reinforcing plies (not shown) disposed between outer and inner surfaces 210 and 212. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 200 can include any feature or combination of features suitable for forming a substantially fluid-tight connection with end member assembly 300 and/or end member assembly 400. As one example, flexible spring member 200 can include a mounting bead 214 disposed along end 206 of flexible wall 204 and a mounting bead 216 disposed along end 208 of the flexible wall. In some cases, the mounting beads, if provided, can, optionally, include a reinforcing element, such as an endless, annular bead wire 218, for example.

It will be appreciated that the end member assemblies can be of any suitable type, kind, construction and/or configuration, and can be operatively connected or otherwise secured to the flexible spring member in any suitable manner. In the exemplary arrangements shown herein, for example, end member assembly 300 is of a type commonly referred to as a bead plate and includes an end member wall 302 with a mounting wall portion 304 and an outer peripheral wall portion 306. End member assembly 300 is disposed along end 206 of flexible wall 204 with outer peripheral wall portion 306 crimped or otherwise deformed around at least a portion of mounting bead 214 such that a substantially fluid-tight seal can be formed between flexible spring member 200 and end member assembly 300. Mounting wall portion 304 can have an approximately planar outer surface portion 308 dimensioned to abuttingly engage an associated structural or suspension component (e.g., upper structural or suspension component USC). Mounting wall portion 304 can at least partially define one or more passages or openings 310 extending through end member assembly 300, such as may be suitable for operatively connecting a pressurized gas line in fluid communication with assembly AS1, such as is shown in FIG. 1, for example.

Gas spring assembly AS1 can be disposed between associated sprung and unsprung masses of an associated vehicle in any suitable manner. For example, one end member can be operatively connected to the associated sprung mass with the other end member disposed toward and operatively connected to the associated unsprung mass. As shown in FIGS. 2, 3, 14 and 15, for example, end member assembly 300 can be secured on or along a first or upper structural or suspension component USC and can be secured thereto in any suitable manner. For example, one or more securement devices, such as mounting studs 312, for example, can be included along end member assembly 300. In some cases, the one or more securement devices (e.g., mounting studs 312) can project outwardly from mounting wall portion 304 of end member assembly 300 and can be secured thereon in a suitable manner, such as, for example, by way of a flowed-material joint (not shown) or a press-fit connection (not identified). Additionally, such one or more securement devices can extend through mounting holes HLS in upper structural component USC and can receive one or more threaded nuts 314 or other securement devices, for example. As an alternative to one or more of mounting studs 312, one or more threaded passages (e.g., blind passages and/or through passages) could be used in conjunction with a corresponding number of one or more threaded fasteners.

End member assembly 400 can be secured on or along a second or lower structural or suspension component LSC using a mounting member 900 or a mounting member 1000 in accordance with the subject matter of the present disclosure. In a preferred arrangement, lower structural or suspension component LSC includes a structural or suspension component volume EXT that is external to gas spring and gas damper assembly AS1. Again, in accordance with the subject matter of the present disclosure, gas spring and damper assembly is supported on lower structural or suspension component LSC and in fluid communication with suspension component volume EXT thereof through or otherwise by way of mounting member 900 or 1000, such as is described in detail hereinafter.

It will be appreciated that end member assembly 400 can be secured on or along mounting member 900 or 1000 in any suitable manner. As one example, mounting members 900 and 1000 can include one or more mounting holes HLS extending therethrough. In such case, one of threaded fasteners 402 could extend through one of mounting holes HLS and threadably engage end member assembly 400 to secure the end member assembly on or along the mounting member, such as is shown in FIGS. 2, 3 and 14-16, for example. It will be appreciated, however, that other configurations and/or arrangements could alternately be used.

End member assembly 400 is shown as including features associated with a type of end member commonly referred to as a piston (or a roll-off piston). It will be recognized that a wide variety of sizes, shapes, profiles and/or configurations can and have been used in forming end members of the types and kinds referred to as pistons or roll-off pistons, such as end member assembly 400, for example. As such, it will be appreciated that the exterior walls and/or wall portions of the end member assembly can be of any suitable shape, profile and/or configuration, such as may be useful to provide one or more desired performance characteristics, for example, and that the profile shown herein is merely exemplary.

End member assembly 400 extends longitudinally between an end 404 and an end 406. End 404 is adapted to receivingly engage end 208 of flexible spring member 200 with end 406 of end member assembly 400 adapted for securement on or along an associated structural component, such as has been described above in connection with lower structural (or suspension) component LSC, for example. End member assembly 400 includes an end member shell (or end member body) 408, an end member core (or end member core assembly) 410, and can also, optionally, include one or more additional components and/or elements. End member shell 408 has a first or outer side wall (or side wall portion) 412 that extends generally longitudinally between first and second ends 404 and 406.

Figure 2:
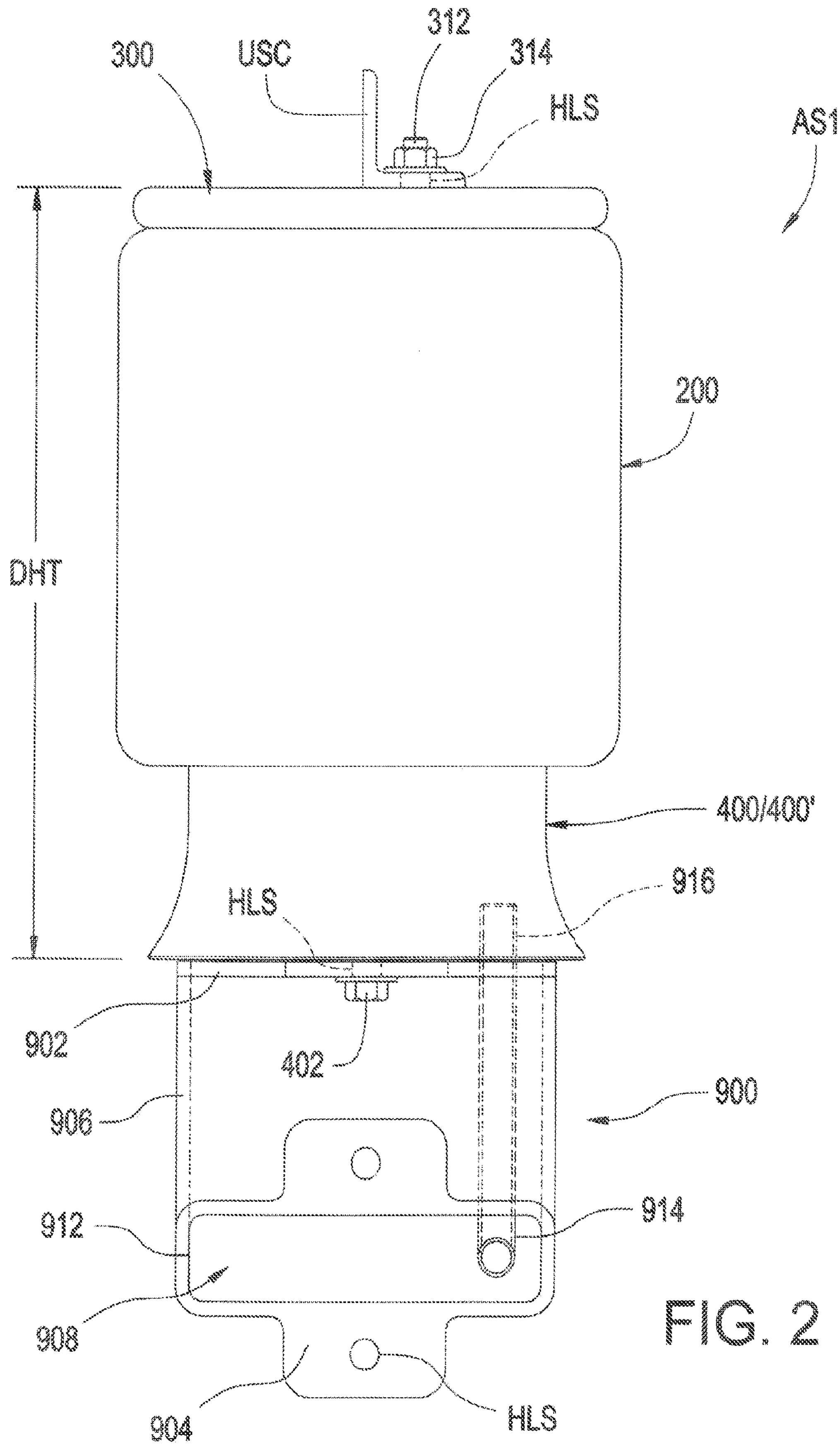
FIG. 2 is a side elevation view of one example of a gas spring and gas damper assembly and an external mounting member in accordance with the subject matter of the present disclosure.
Figure 4:
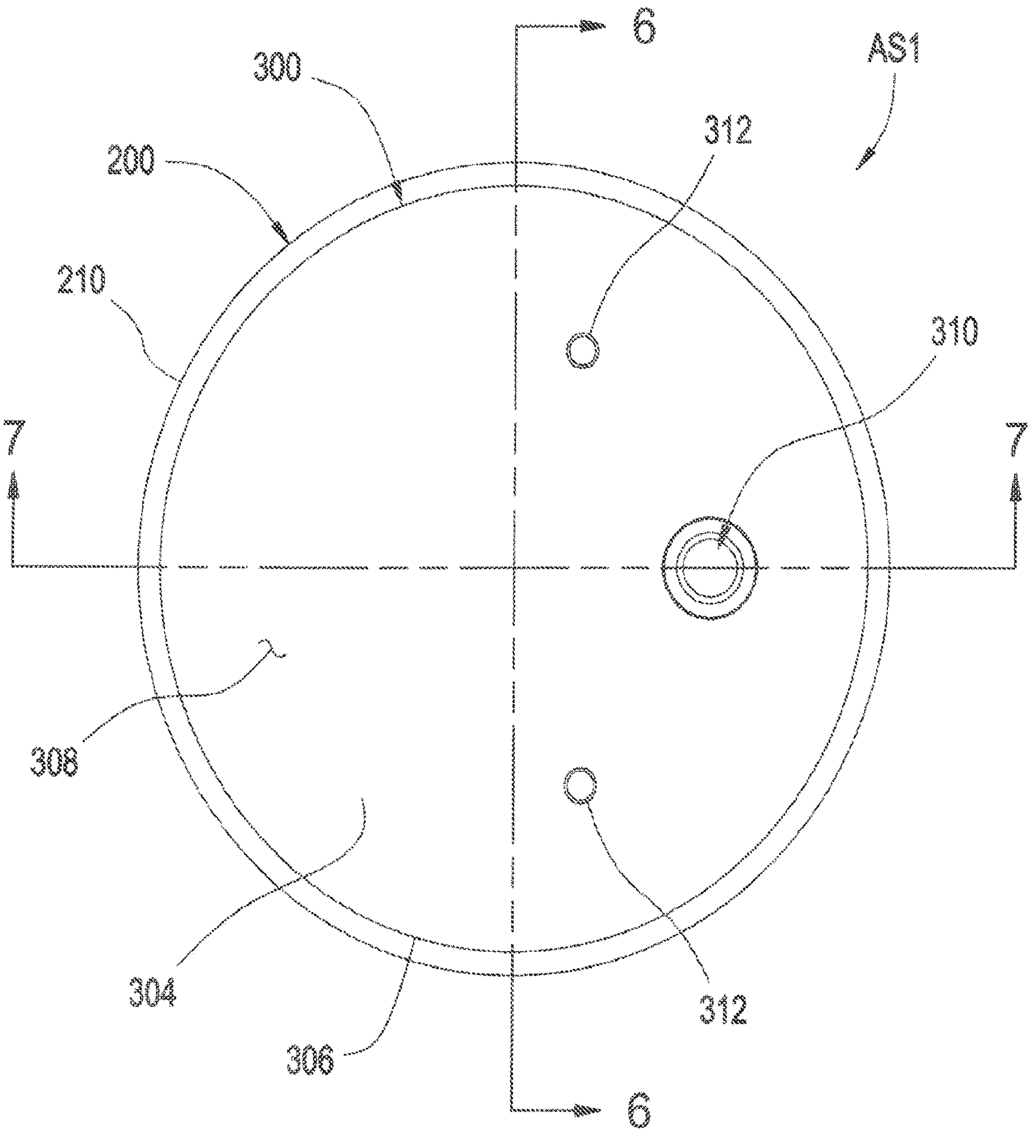
FIG. 4 is a top plan view of the exemplary gas spring and damper assembly in FIGS. 2 and 3.
Figure 5:
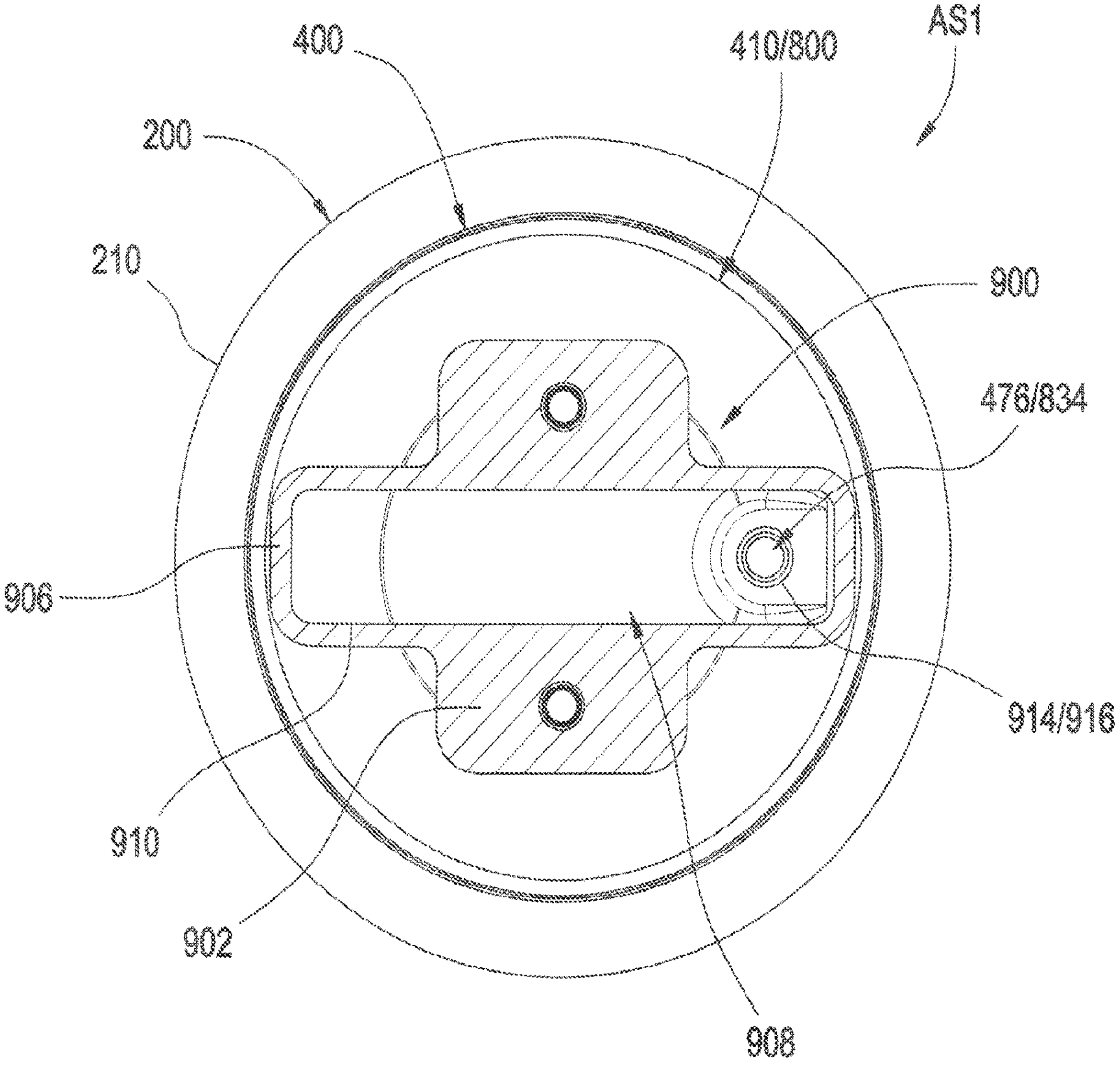
FIG. 5 is a cross-sectional plan view of the exemplary gas spring and gas damper assembly and external mounting member shown in FIGS. 2-4 taken from along line 5-5 in FIG. 3.

In an assembled condition and during use, a portion of flexible spring member 200 forms a rolling lobe 220 that is displaced along an outer surface portion 414 of outer side wall portion 412 as the gas spring and gas damper assembly undergoes changes in overall height, such as, for example, may be due to variations in load conditions applied thereto, as is well understood by those of skill in the art. Gas spring and gas damper assembly AS1 is shown in FIGS. 2 and 4 at a design or nominal height, which is represented in FIG. 2 by reference dimension DHT.

In addition to outer side wall portion 412, end member shell 408 includes an inner side wall portion 416 that is disposed radially inward of outer side wall portion 412. End member shell 408 also includes an end wall portion 418 that is oriented transverse to longitudinal axis AX and is disposed inwardly of inner side wall portion 416. In some cases, end wall portion 418 can at least partially define a closed end of the end member shell along end 404 with outer side wall portion 412 at least partially defining an open end of the end member shell along end 406.

End member shell 408 also includes an intermediate wall portion 420 that extends between and interconnects outer side wall portion 412 with inner side wall portion 416. The intermediate wall portion can have an inverted and somewhat U-shaped cross-sectional profile that forms a distal extent 422 of end member shell 408 along end 404 of the end member. Inner side wall portion 416 can, in some cases, be disposed at an acute angle relative to longitudinal axis AX such that the inner side wall portion of end member shell 408 has an inner surface portion 424 with a frustoconical shape or configuration. End wall portion 418 includes an end surface (or end surface portion) 426 that faces opposite end 406 and an end surface (or end surface portion) 428 that faces toward end 406. End wall portion 418 is axially offset from distal extent 422 in a direction toward end 406 such that end surface portion 426 together with inner surface portion 424 at least partially defines a recess 430 extending into end member shell 408 from along end 404.

End member core assembly 410 is at least partially received within or is otherwise disposed on or along the open end of end member shell 408 such that the end member core assembly and the end member shell together at least partially define an end member chamber 432 within end member assembly 400. In such an arrangement, recess 430 is disposed along end wall portion 418 and exposed outwardly along end member shell 408 with a recess opening 434 facing axially away from end member chamber 432.

It will be appreciated that end member core assembly 410 can be constructed in any suitable manner and can include any suitable number of one or more walls and/or wall portions. Additionally, it will be appreciated that end member shell 408 and end member core assembly 410 can be secured to one another in any manner or arrangement suitable for forming a substantially fluid-tight connection therebetween. In such an arrangement, end member chamber 432 is substantially fluidically isolated from an external atmosphere ATM of gas spring and gas damper assembly AS1.

As one non-limiting example, end member core assembly 410 can include a core base wall (or core base wall portion) 436 that is oriented transverse to longitudinal axis AX and is secured on or along end member shell 408 toward end 406 of end member assembly 400. It will be appreciated that core base wall 436 of end member core assembly 410 can be secured on or along end member shell 408 in any suitable manner. As one non-limiting example, an outer peripheral edge 438 of core base wall 436 can be attached to outer side wall portion 412 in a suitable manner, such as by way of a flowed-material joint 440, for example. Core base wall 436 can include a first or inner surface (or surface portion) 442 facing toward end member chamber 432. Core base wall 436 can also include a second or outer surface (or surface portion) 444 facing opposite inner surface 442 and dimensioned to abuttingly engage second or lower structural component LSC. Core base wall 436 can also include mounting holes 446 extending therethrough with a threaded insert 448 secured on or along core base wall 436 in communication with mounting holes 446 in a suitable manner, such as by flowed-material joints 450, for example.

End member core assembly 410 also includes a support column wall 452 extending from along core base wall 436 toward end 404 of the end member assembly, such as to assist in carrying forces and/or loads from end wall portion 418 to core base wall 436, for example. Support column wall 452 can be secured on or along end wall portion 418 in any suitable manner, such as by way of a flowed-material joint 453, for example. In some cases, support column wall 452 can be configured to at least partially define a column cavity 454 within the support column. In such cases, support column wall 452 can, optionally, include one or more openings or passages 456 extending through the support column wall such that column cavity 454 is in fluid communication with end member chamber 432 through openings 456, such as to permit the portions of end member chamber 432 inside and outside of support column wall 452 to fluidically operate as a substantially-contiguous volume.

End member core assembly 410 can include an inner end wall (or inner end wall portion) 458 disposed within end member chamber 432 and supported on or along support column wall 452. If included, inner end wall portion 458 can be oriented transverse to longitudinal axis AX and can include an end surface portion 460 disposed in abutting engagement with end surface portion 428 of end wall portion 418. It will be appreciated that inner end wall 458, if included, can be secured or otherwise provided on or along support column wall 452 in any suitable manner. As non-limiting examples, inner end wall portion 458 could be integrally formed with the support column wall or inner end wall portion 458 could be provided separately and secured to support column wall 452, such as by way of a flowed-material joint 462.

End closure assembly 500 is shown in FIG. 4 as including an end closure body 502 and is operatively secured on or along end 404 of end member assembly 400. As such, in some cases, end closure assembly 500 can be considered or otherwise deemed to be part of end member assembly 400. End closure body 502 includes an end closure wall 504 that extends around and radially outward from axis AX in transverse relation thereto. End closure wall 504 includes a surface (or surface portion) 506 disposed along one side of end closure body 502 and a surface (or surface portion) 508 disposed along another side of end closure body 502. In a preferred arrangement, surface portion 506 can be approximately planar. Surface portion 508 can be disposed toward and dimensioned to abuttingly engage end wall portion 418 of end member shell 408. End closure wall 504 also includes an outer peripheral surface portion 510 that faces radially outward and extends axially between surface portions 506 and 508. In some cases, end closure wall 504 can include or otherwise at least partially define a bead seat 512 that can extend annularly around end closure body 502 and can be dimensioned to at least partially receive or otherwise abuttingly engage mounting bead 216 and/or bead wire 218 of flexible spring member 200.

It will be appreciated that outer peripheral surface portion 512 can be of any suitable size, shape and/or configuration. For example, the outer peripheral surface portion can have a cross-sectional profile with any suitable number of linear and/or curved profile segments. In an assembled condition, end closure assembly 500 is operatively engaged with a portion of flexible spring member 200 (e.g., mounting bead 216), such as on or along outer peripheral surface portion 512, for example.

End closure assembly 500 can be secured on or along end member assembly 400 in any manner suitable for compressively capturing a portion of flexible spring member 200 (e.g., mounting bead 216) in abutting engagement between outer peripheral surface portion 512 and inner surface portion 424 of inner side wall portion 416 of end member shell 408. As a non-limiting example, a securement device 464 (e.g., threaded fastener) can extend through and thereby secure end closure assembly 500 on or along end member assembly 400. In such an example, end closure wall 504 can include a hole or passage 514 extending through end closure body 502. Additionally, end wall portion 418 can also include a hole or passage 466 extending therethrough that is cooperative with hole 514. Securement device 464 can extend through hole 514 in the end closure wall, through hole 466 in end wall portion 418 and into engagement with a corresponding securement device 468 (e.g., a threaded passage) of inner end wall portion 458. It will be appreciated, however, that other configurations and/or securement arrangements can alternately be used without departing from the subject matter of the present disclosure.

In a preferred arrangement, spring chamber 202 can be disposed in fluid communication with end member chamber 432 such that gas transfer between the spring chamber and the end member chamber can generate pressurized gas damping during extension and/or compression of the gas spring and gas damper assembly as the same undergoes dynamic use in operation. As a non-limiting example spring chamber 202 and end member chamber 432 can fluidically communicate with one another through end closure assembly 500, such as is discussed in greater detail hereinafter.

In some cases, gas spring and gas damper assembly AS1 can include one or more fluid communication passages fluidically connected between the spring chamber and one or more additional volumes operatively associated with the gas spring and gas damper assembly. As non-limiting examples, such additional volumes can include internal volumes (e.g., end member chamber 432) and/or external volumes (e.g., suspension component chambers EXT), such as are represented in at least FIGS. 3 and 15, for example. Generally, the one or more fluid communication passages can be dimensioned such that pressurized gas flows into, out of, through and/or is otherwise displaced within the fluid communication passage or passages.

In some cases, one or more of the fluid communication passages can be configured, constructed and/or otherwise dimensioned such that the pressurized gas flow moving therethrough can generate pressurized gas damping of vibrations and/or other dynamic inputs acting on the overall assembly and/or system. In such cases, such one or more fluid communication passages may be referred to herein as gas damping passages or, in some cases, elongated gas damping passages. In operation, differential pressure between the spring chamber and the one or more additional volumes induces gas flow along at least a portion of the length of the corresponding gas damping passage(s). It will be appreciated that such movement of the pressurized gas within and/or through such a gas damping passage can act to dissipate kinetic energy acting on the assembly and/or system. In a preferred arrangement, such pressurized gas damping can be configured for or otherwise targeted to dissipate vibrations and/or other dynamic inputs having a particular, predetermined natural frequency or within a particular, predetermine range of frequencies.

For example, end closure body 502 can include an opening or port 516 that extends into end closure wall 504 and is accessible from along surface portion 506. End wall portion 418 includes an opening or port 470 that extends through the end wall portion and is positioned to fluidically communicate with one or more features of end closure body 502 in an assembled condition. End closure body 502 includes a passage 518 at least partially formed within end closure wall 504. In a preferred arrangement, passage 518 extends from a first end 520 disposed in fluid communication with opening 516 of the end closure body to a second end 522 disposed in fluid communication with opening 470 in end wall portion 418.

End closure wall 504 can include a passage surface 524 that at least partially defines passage 518. It will be appreciated that passage surface 524 can have any suitable cross-sectional shape and/or profile. Passage 518 is shown as having a spiral-like configuration, such as may be generated by substantially-continuously rotating the cross-sectional profile of passage surface 524 about axis AX with the cross-sectional profile substantially-continuously displaced radially outward from adjacent axis AX to form the spiral-like configuration. In a preferred arrangement, such rotation of the cross-sectional profile of passage surface 524 can occur in an approximately single plane such that the spiral-like configuration of passage 518 is disposed in a common plane that is oriented transverse to longitudinal axis AX.

In some cases, the cross-sectional profile of passage surface 524 can be open (i.e., not fully enclosed). In such cases, passage 518 can be open along one or more surface portions (e.g., surface portion 508) of end closure body 502. For example, the cross-sectional profile of passage surface 524 is shown as having an approximately U-shaped cross-sectional configuration. As such, passage 518 is formed within end closure body 502 as an open channel that is accessible from along surface portion 508. In cases in which the cross-sectional profile of passage surface 524 is open or otherwise not fully enclosed, end wall portion 418 extends across surface portion 508 to substantially inhibit or at least reduce pressurized gas transfer between adjacent rings or other sections of passage 518 along surface portion 508. In some cases, passage 518 can be configured, constructed and/or otherwise dimensioned to provide pressurized gas damping of approximately a desired or target frequency or otherwise within a desired or targeted range of frequencies. In such cases, passage 518 will function as and can be alternately referred to herein as an elongated gas damping passage. As a non-limiting example, such a targeted frequency range can include inputs within a range of from approximately 8 Hz to approximately 15 Hz.

End closure wall 504 of end closure body 502 also includes a mounting wall (or mounting wall portion) 526 that extends in a generally axial direction from along surface portion 506 of the end closure wall toward a distal edge 528. Mounting wall portion 526 can include one or more inner surfaces (or inner surface portions) 530 that can at least partially form an end closure recess 532 extending into the end closure body. Mounting wall portion 526 can also include an outer surface 534 that can include one or more outer surface portions and can be dimensioned to receive and retain an end of a travel-limiting device, such as is described hereinafter. In some cases, one or more projections can extend radially outward from along outer surface 534, such as may be useful to retain or assist in retaining the end of the travel-limiting device on or along mounting wall 526. In the arrangement shown, a bead retaining wall (or wall portion) 536 extends radially outward beyond outer surface 534 and peripherally around axis AX.

In a preferred arrangement, end closure wall 504 includes one or more notches or slots 538 that extend into at least mounting wall portion 526. In the arrangement shown in FIGS. 6-8, 10 and 16, notches 538 are disposed opposite one another and separate outer surface 534 into at least outer surface portions 534A and 534B. Additionally, notches 538 separate bead retaining wall 536 into at least bead retaining wall portions 536A and 536B. It will be appreciated that any suitable number of one or more notches can be included, such as from two (2) to sixteen (16) notches, for example, with the notches separating the outer surface and bead retaining wall into a corresponding number of two or more surface portions and/or wall portions.

In some cases, end closure body 502 can also include a passage 540 extending through end closure wall 504 that is separate and fluidically distinct from passage 518. In a preferred arrangement, passage 540 can extend from along surface portion 506 through the end closure wall to surface portion 508. In some cases, a passage wall (or passage wall portion) 542 can project or otherwise extend axially beyond surface portion 508 toward a distal end wall portion 544. In some cases, distal end wall portion 544 can at least partially define a damping orifice 546 dimensioned to control or otherwise establish pressurized gas damping on, along or otherwise through passage 540. In such cases, damping orifice 546 will have a reduced cross-sectional dimension (e.g., diameter) relative to the cross-sectional dimension (e.g., diameter) of passage 540. In some cases, damping orifice 546 can be dimensioned to provide gas damping of approximately a desired or target frequency or otherwise within a desired or targeted frequency range. In such cases, passage 540 can be alternately referred to herein as a gas damping passage. As a non-limiting example, such a targeted frequency range can include inputs within a range of from approximately 0.5 Hz to approximately 2 Hz.

Figure 3:
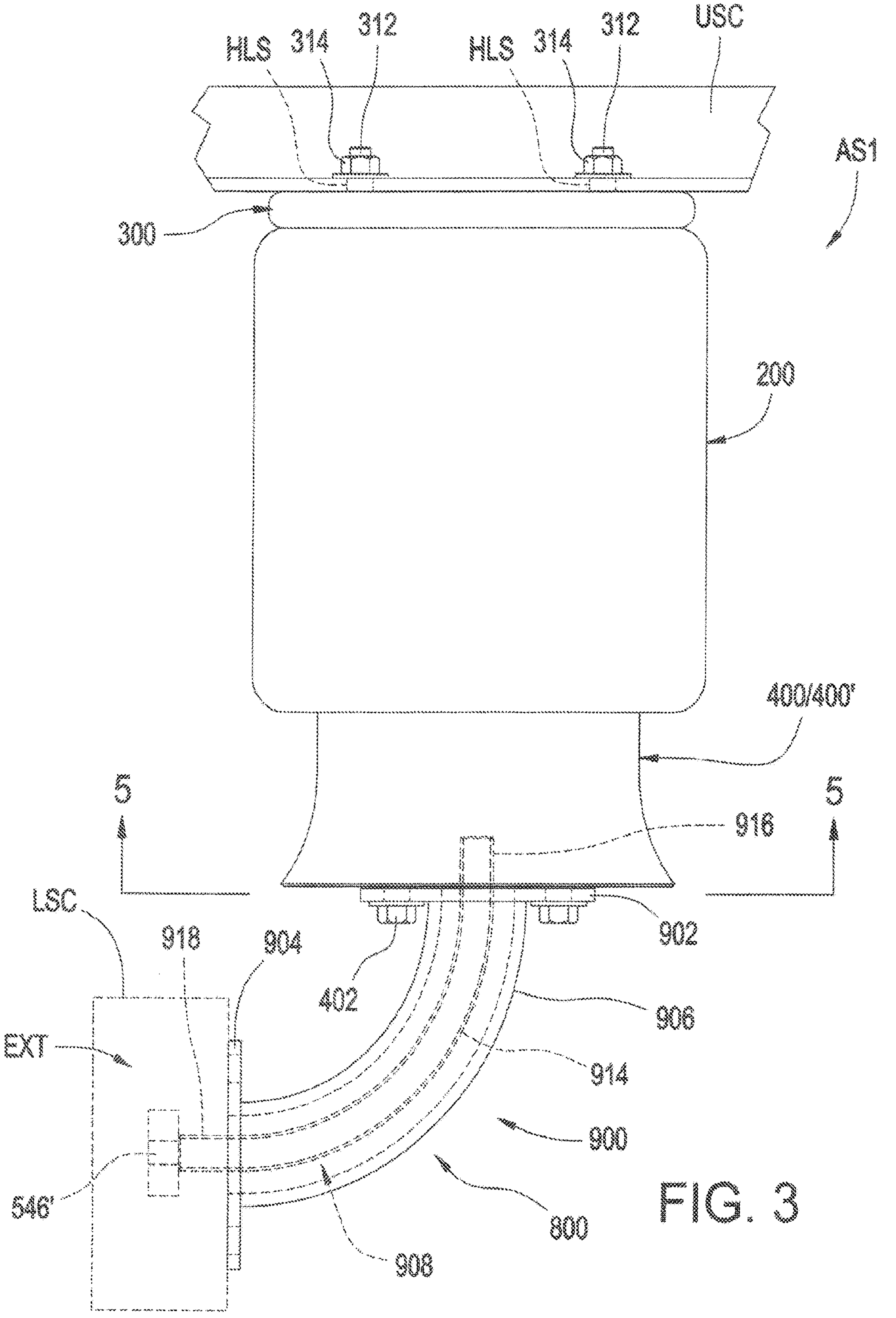
FIG. 3 is another side elevation view of the exemplary gas spring and gas damper assembly and external mounting member shown in FIG. 2 disposed in fluid communication with an external volume.
Figure 15:
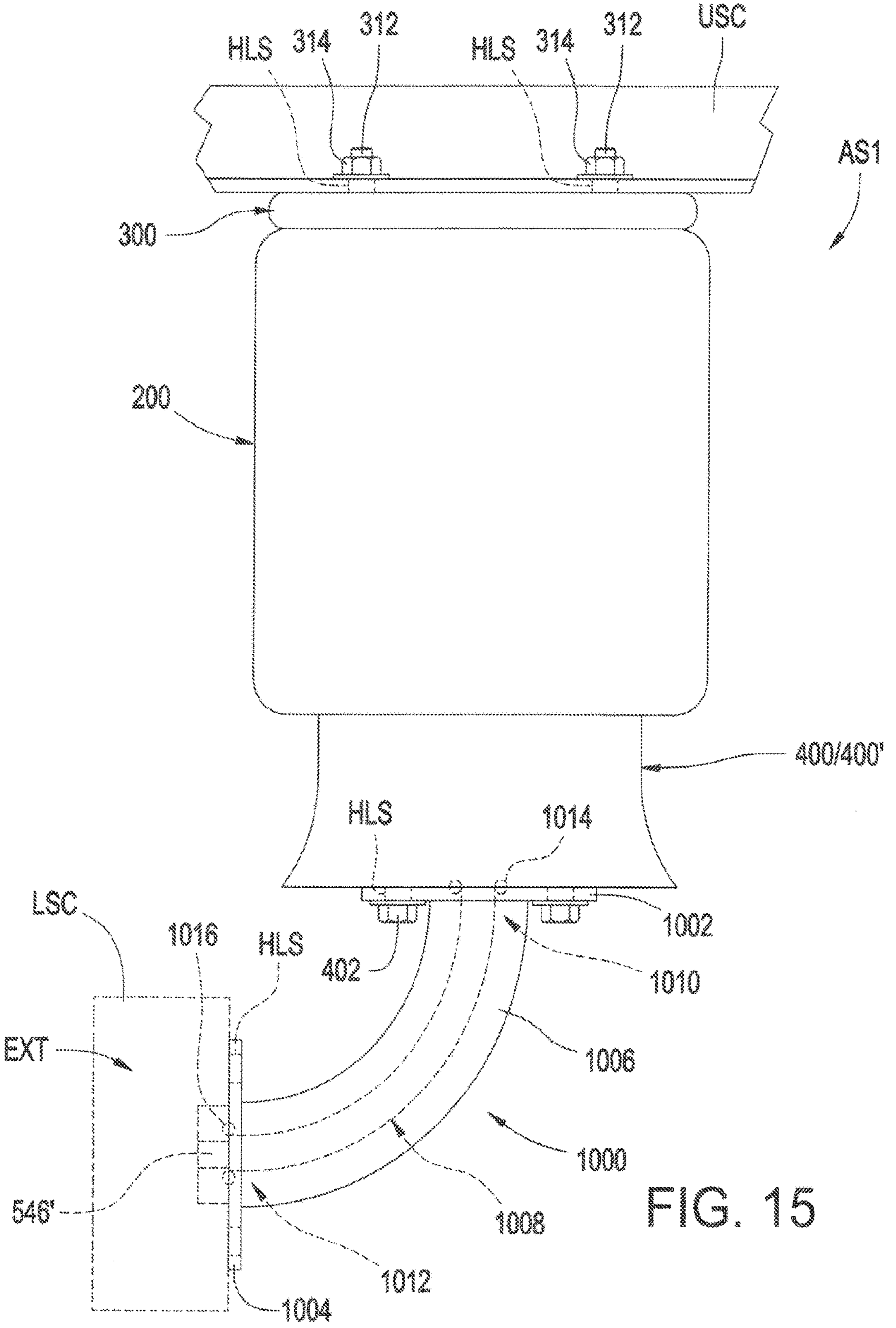
FIG. 15 is another side elevation view of the exemplary gas spring and gas damper assembly and external mounting member shown in FIG. 14 disposed in fluid communication with an external volume.

It will be appreciated, however, that instead of being physically positioned on or along passage 540, the damping orifice can be in fluid communication with passage 540 but positioned or otherwise operatively disposed in a distal location, such as on or along another component or device that is operatively associated in fluid communication with passage 540. As a non-limiting example, a damping orifice 546' could alternately be located on or along lower suspension component LSC in fluid communication with suspension component volume EXT while remaining in fluid communication with passage 540, such as is shown in FIGS. 3 and 15. In such cases, passage 472 (discussed below) and passage 540 will continue to function as and may be referred to herein as gas damping passages.

Figure 7:
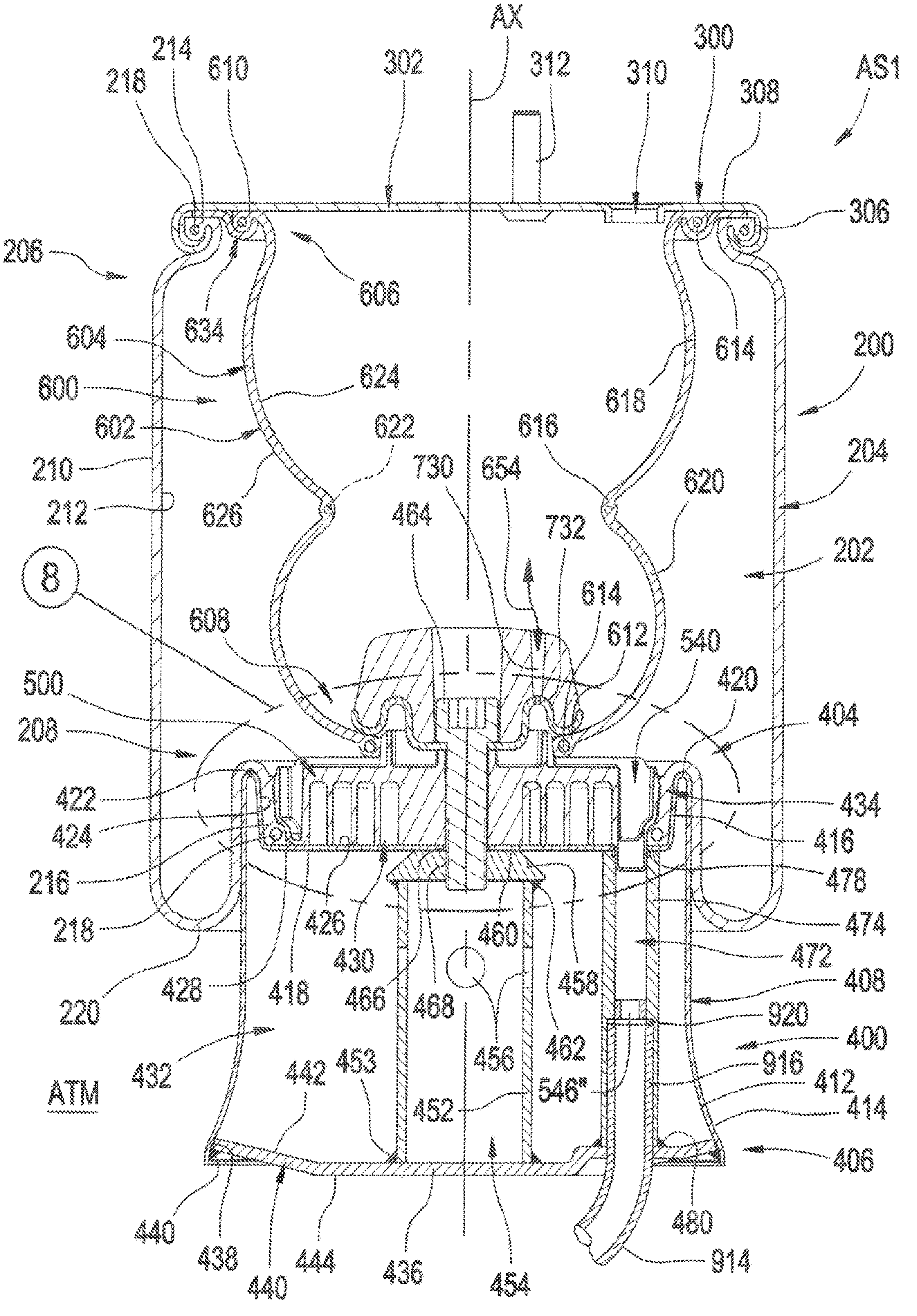
FIG. 7 is a cross-sectional side view of the exemplary gas spring and gas damper assembly shown in FIGS. 2-6 taken from along line 7-7 in FIG. 4.
Figure 8:
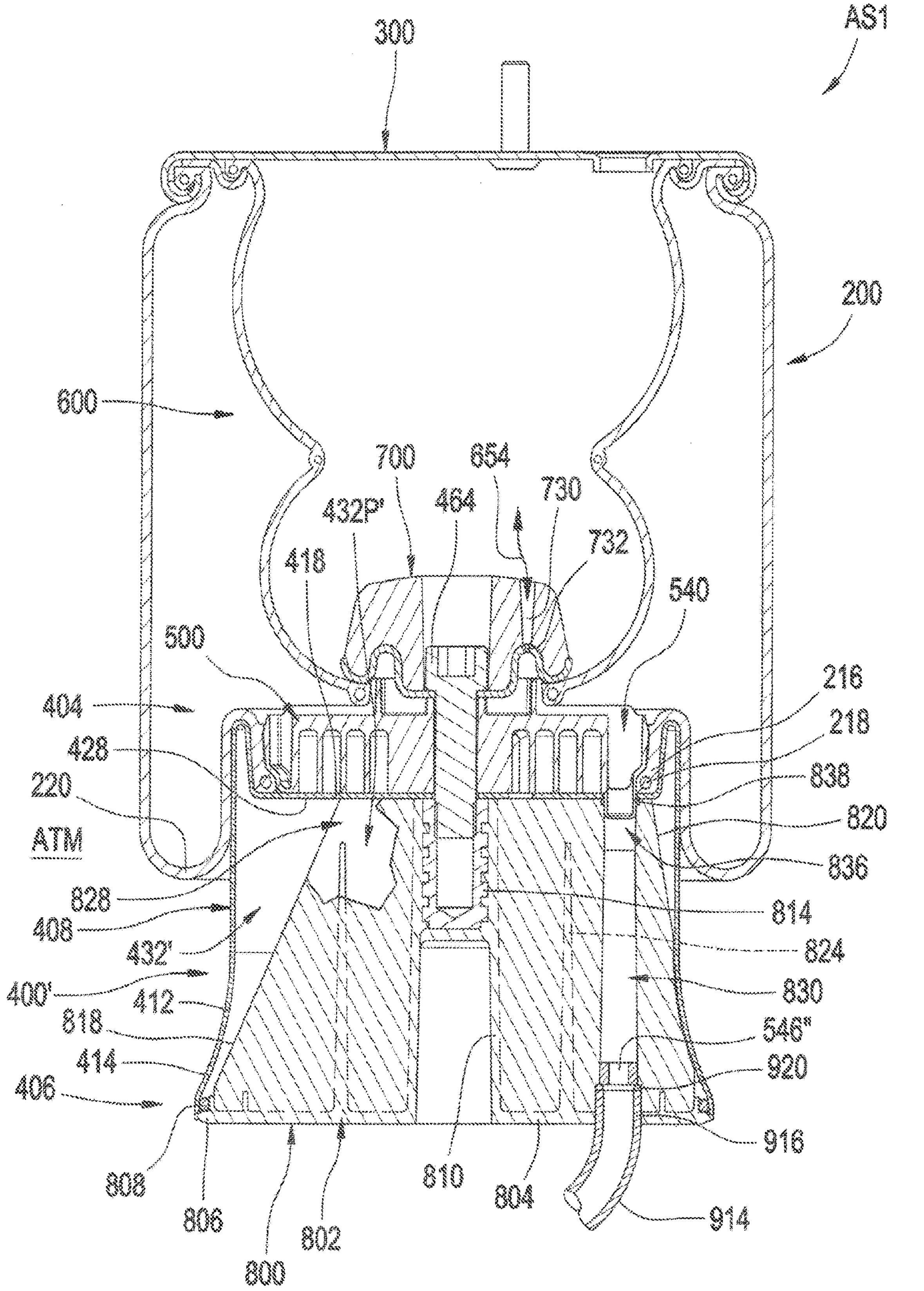
FIG. 8 is a cross-sectional side view of the exemplary gas spring and gas damper assembly shown in FIGS. 2-7 including an alternate construction of an end member assembly in accordance with the subject matter of the present disclosure.
Figure 16:
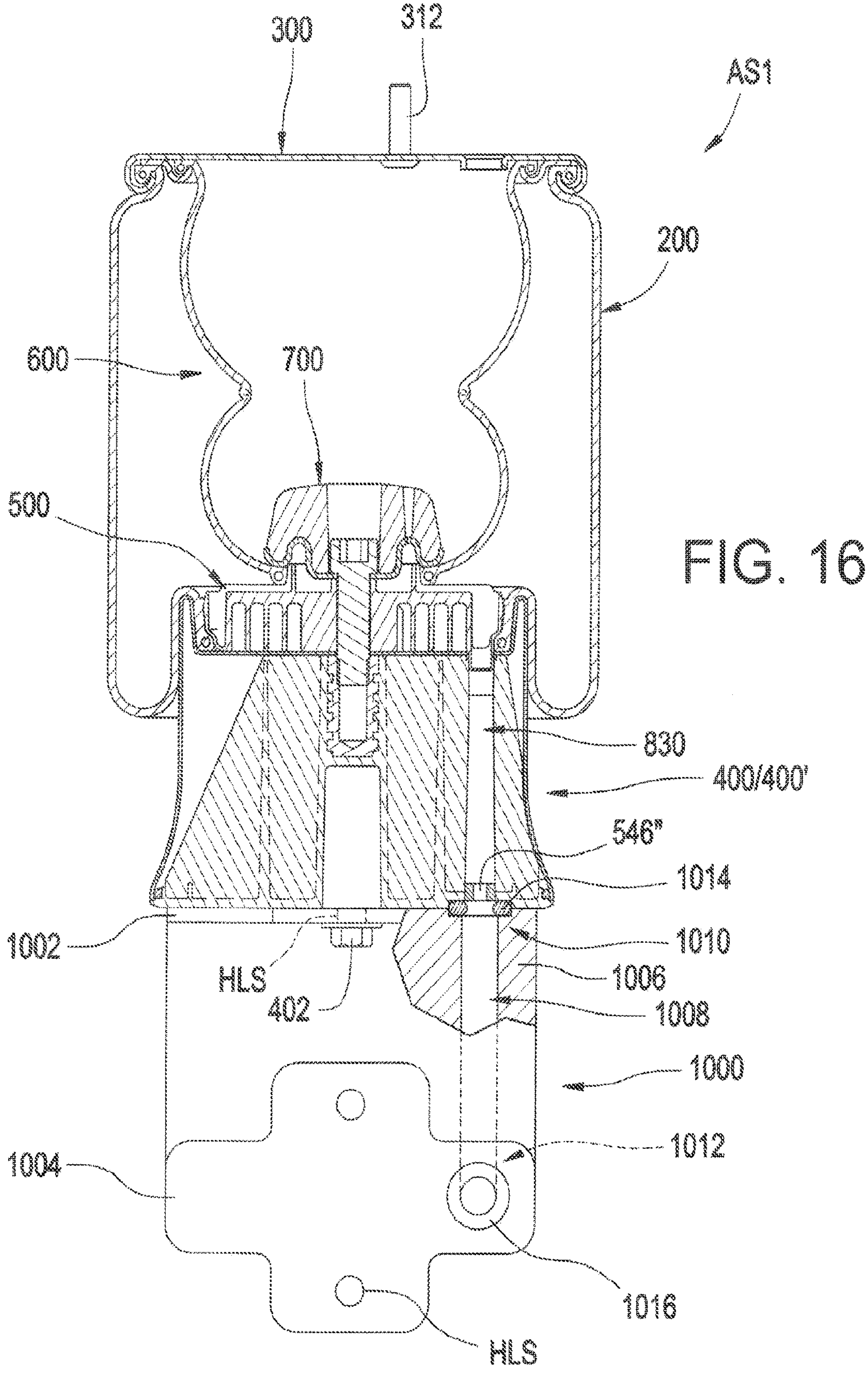
FIG. 16 is a cross-sectional side view of the exemplary gas spring and gas damper assembly shown in FIG. 8 operatively connected to the exemplary external mounting member in FIGS. 14 and 15.

In accordance with the subject matter of the present disclosure, end member assembly 400 also includes a passage 472 extending therethrough. In a preferred arrangement, passage 472 is fluidically isolated from end member chamber 432. Passage 472 can be constructed in any suitable manner. As one example, end member core 410 can include a passage wall (or wall portion) 474 extending from an external communication port 476 formed along core base wall 436 toward a distal passage end 478. Passage wall 474 can be secured on or along core base wall 436 in any manner suitable for forming a substantially fluid-tight connection therebetween, such as by way of a flowed-material joint 480, for example. External communication port 476 can be dimensioned to receive or otherwise operatively engage an external fluid transfer line. As another non-limiting example, a damping orifice 546" could alternately be located on or along passage 472 while remaining in fluid communication with passage 540, such as is shown in FIGS. 7, 8 and 16, for example. In such cases, passage 472 and passage 540 will function as and may be referred to herein as gas damping passages.

In a preferred arrangement, end member body 408, end member core 410 and end closure 500 are secured together such that passage 540 through end closure body 502 is disposed in fluid communication with passage 472. As one example of a suitable construction, end wall portion 418 of end member body 408 can include an opening or port 482 extending therethrough. Passage wall portion 542 can extend through opening 482 and into coextensive engagement with passage wall portion 474 such that passage 540 is disposed in fluid communication with damping passage 472. In such an arrangement, damping orifice 546 can be positioned at least partially within passage 472. Alternately, as discussed above, damping orifice 546' and/or 546" can be disposed in other, different locations without departing from the subject matter of the present disclosure.

Figure 10:
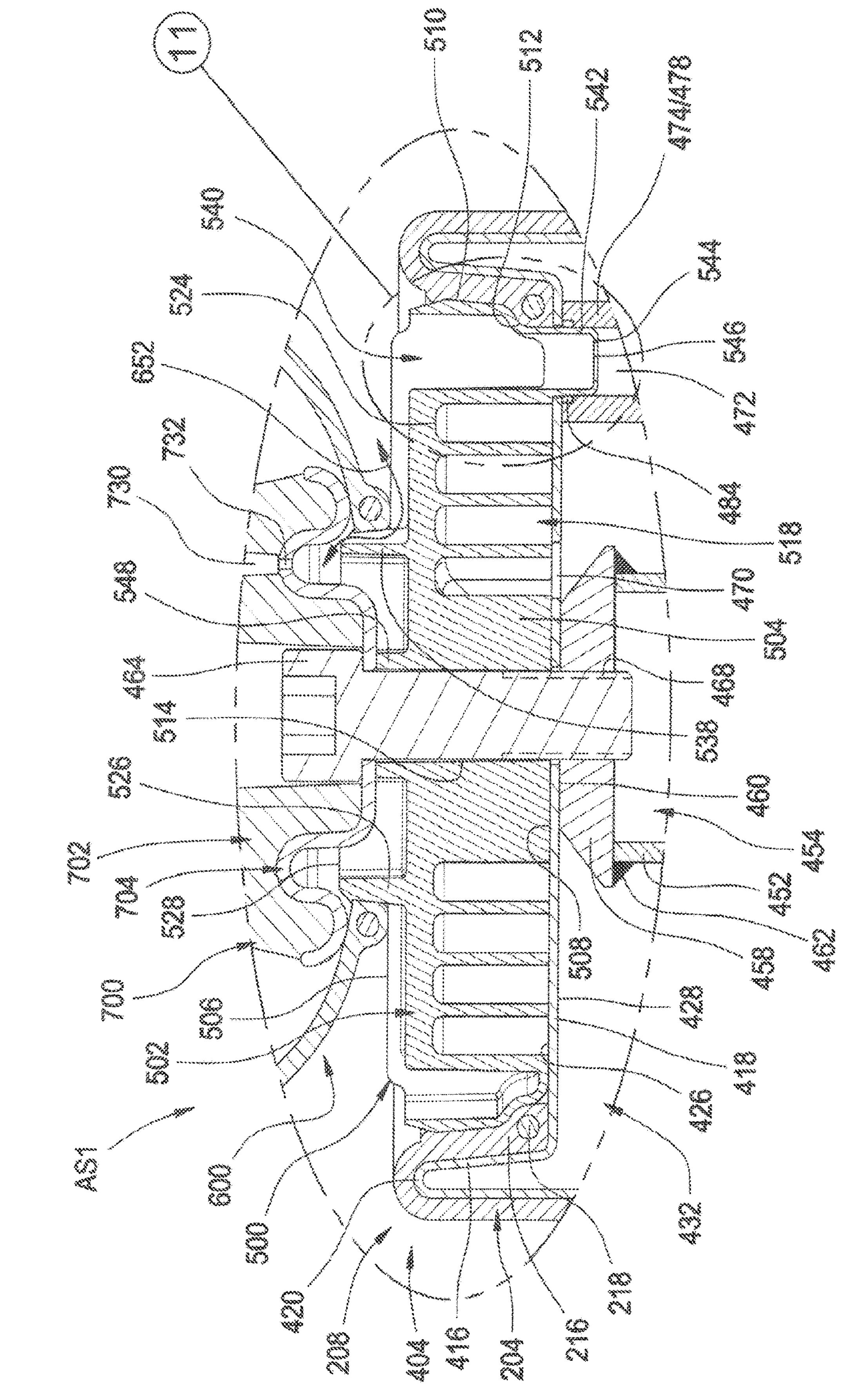
FIG. 10 is a cross-sectional side view of an enlarged portion of the exemplary gas spring and gas damper assembly in FIGS. 2-9 identified as Detail 10 in FIG. 7.
Figure 11:
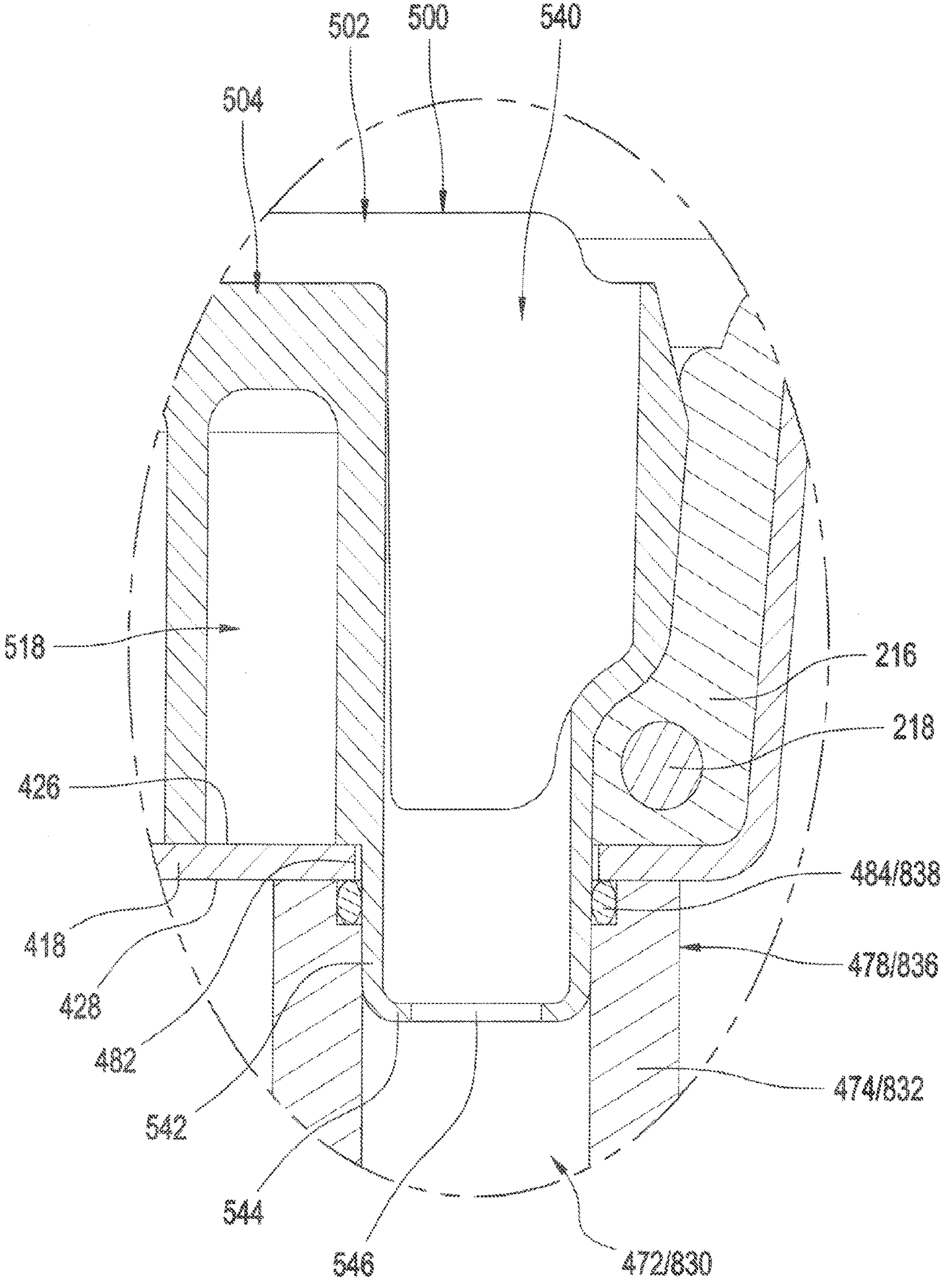
FIG. 11 is a cross-sectional side view of a greatly enlarged portion of the exemplary gas spring and gas damper assembly in FIGS. 2-10 identified as Detail 11 in FIG. 10.
Figure 12:
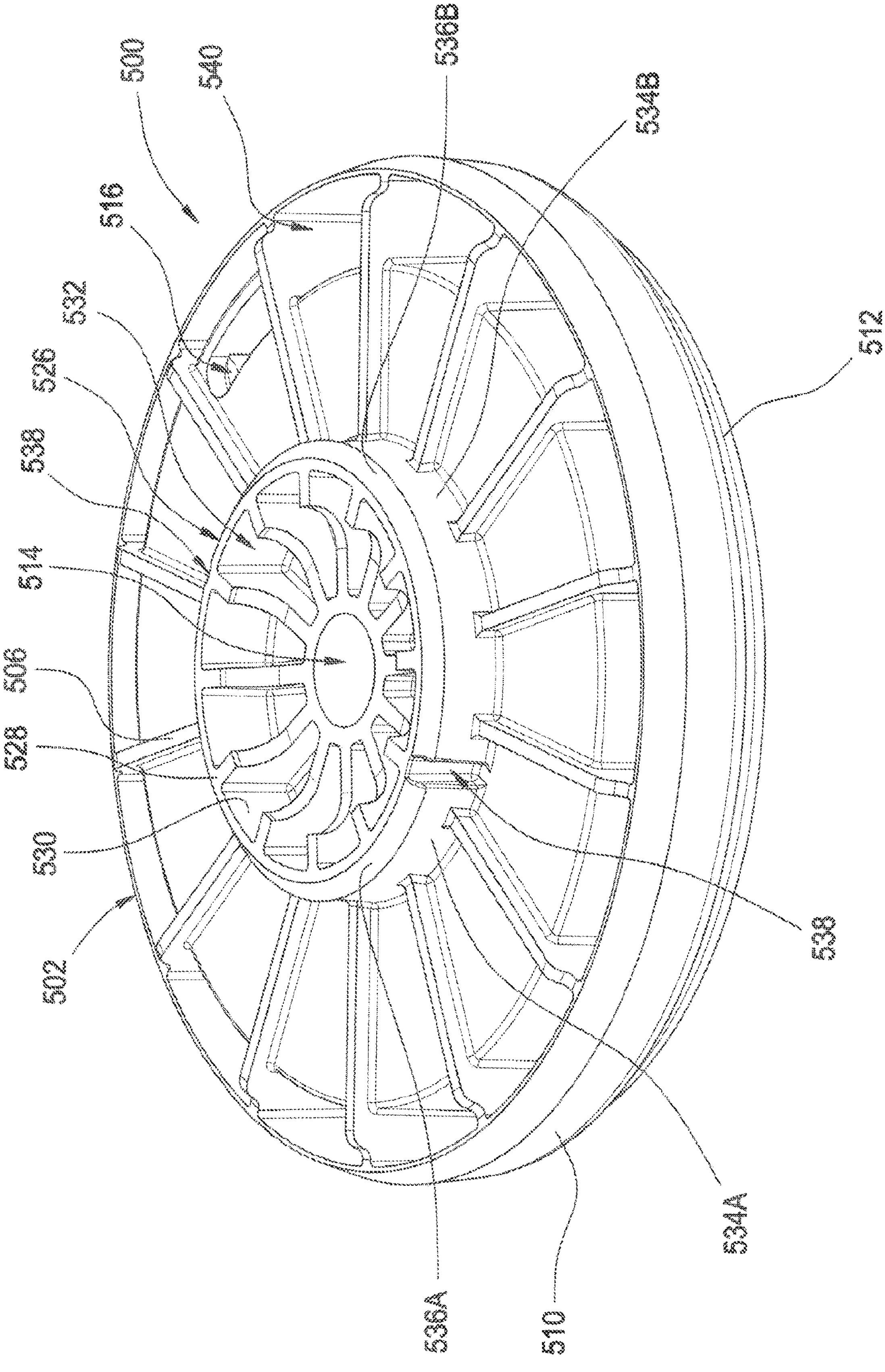
FIG. 12 is a top perspective view of the exemplary end closure in FIGS. 6-8, 10 and 11.
Figure 13:
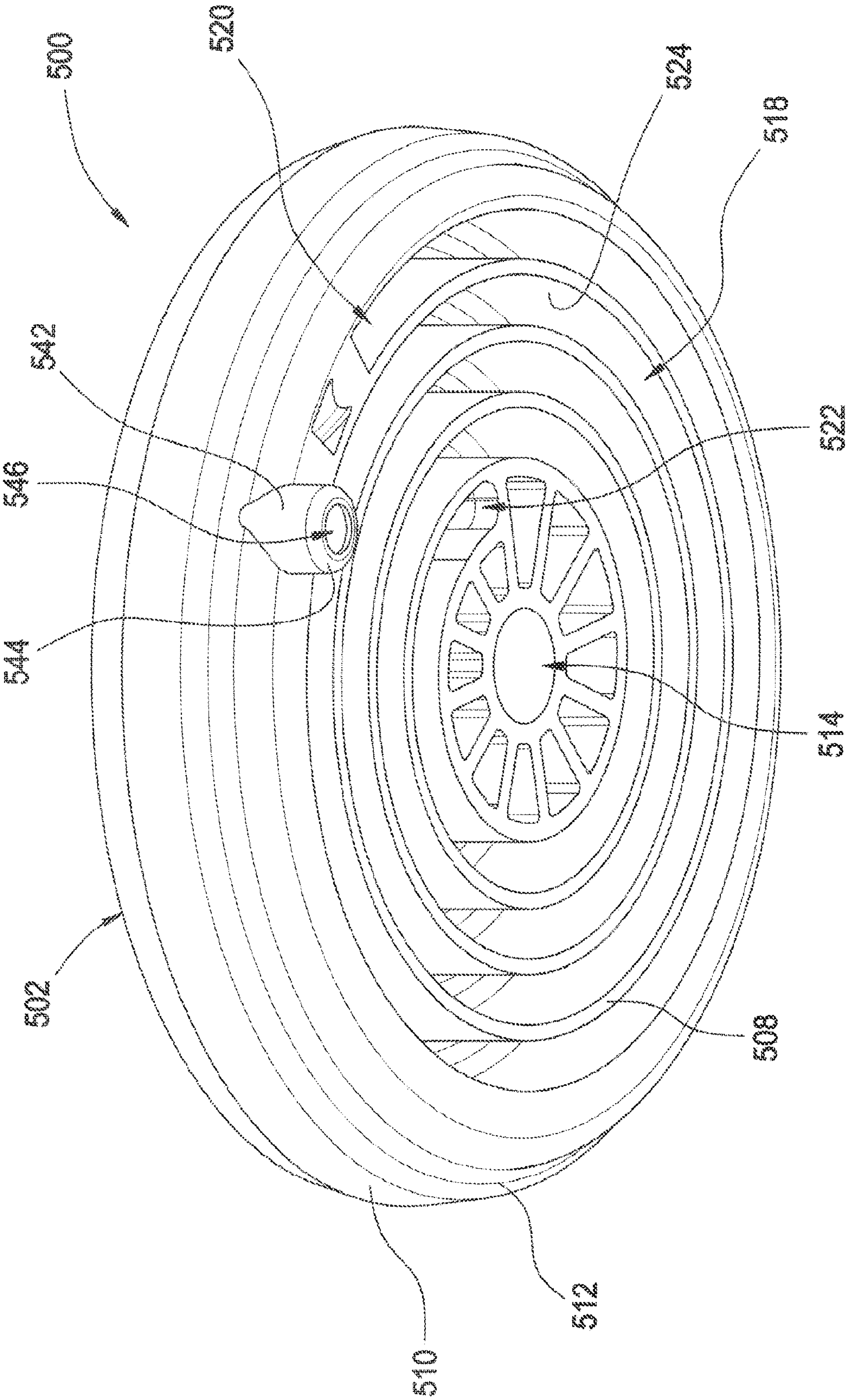
FIG. 13 is a bottom perspective view of the exemplary end closure in FIGS. 6-8 and 10-12.
Figure 14:
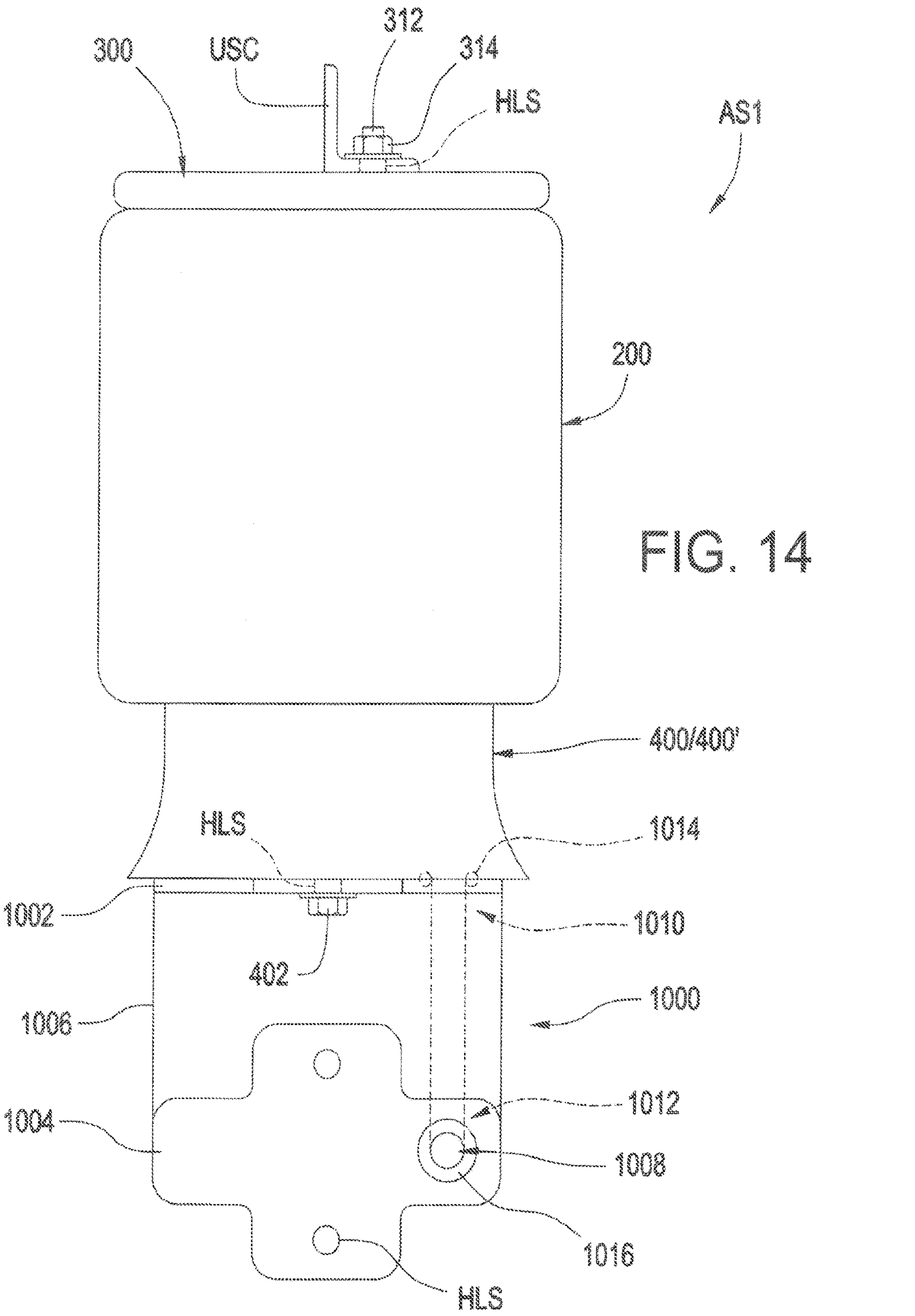
FIG. 14 is a side elevation view of another example of a gas spring and gas damper assembly and an external mounting member in accordance with the subject matter of the present disclosure.

Passage 472 is disposed in fluid communication between spring chamber 202 and external communication port 476. Passage 472 is preferably maintained in fluid isolation relative to end member chamber 432 other than through mutual communication with spring chamber 202. It will be appreciated that such fluid isolation of passage 472 can be provided in any suitable manner and/or through any suitable combination of features and/or components. As a non-limiting example, a sealing device 484 can be sealingly disposed on, along and/or otherwise between passage wall portion 474, passage wall portion 542 and/or end wall portion 418 of end member body 408, such as is shown in FIGS. 10 and 11, for example.

As an alternate construction, an end member assembly 400' can include an end member core 800 in place of end member core 410 shown and described herein. End member core 410 is shown and described as being formed from a plurality of walls and/or wall portions that are joined together in a suitable manner, such as by way of flowed-material joints, for example. End member core 800 differs from end member core 410 in that end member core 800 can include a core body 802, such as may be formed as a single unitary body from a flowable material (e.g., molded polymeric material, cast metal material). In such case, a fluid communication passage such as has been described above as passage 472 can be integrally formed on or along end member core 800. As such, it will be appreciated that core body 802 of end member core 800 can include any suitable number of walls and/or wall portions integrally formed with one another.

Figure 9:
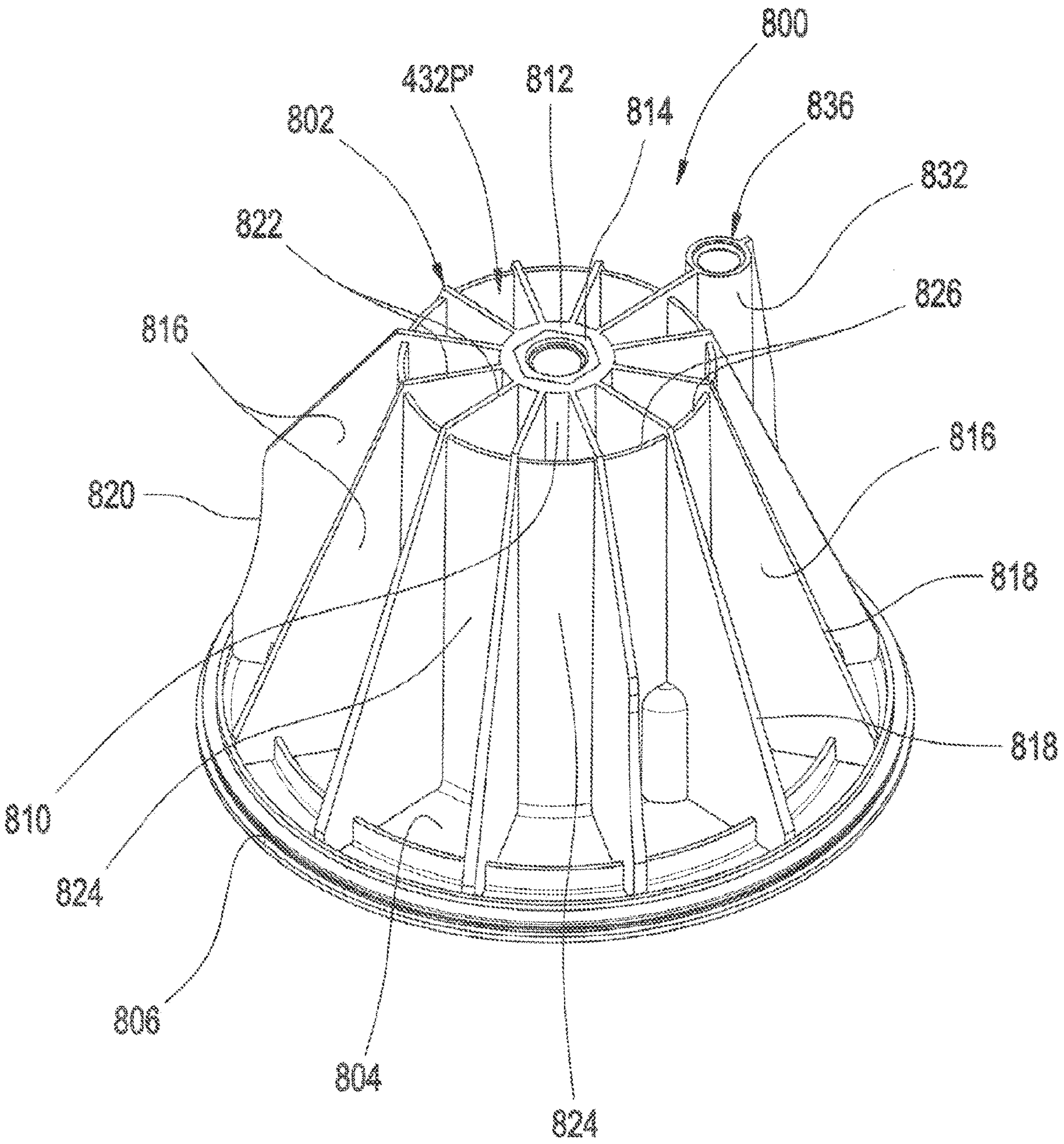
FIG. 9 is a top perspective view of the exemplary end member base assembly shown in FIG. 8.

One non-limiting example of a suitable construction of end member core 800 is shown in FIGS. 8 and 9. It will be appreciated that certain components, devices and/or features shown in FIGS. 8 and 9 are substantially identical to components, devices and/or features shown in FIGS. 2-7 and 10-13 and that such components, devices and/or features are identified in FIGS. 8 and 9 using like reference characters with new or different components, devices and/or features identified by primed (') reference characters.

Core body 802 can include a base wall portion 804 oriented transverse to longitudinal axis AX and extending radially outward to an outer peripheral edge 806. End member core 800 is at least partially received within end member body 408 to at least partially define an end member chamber 432' that is fluidically isolated from external atmosphere ATM. It will be appreciated that a substantially fluid-tight seal can be formed between end member body 408 and end member core 800 in any suitable manner. As one non-limiting example, a sealing device 808 can be sealingly disposed between outer peripheral edge 806 and outer side wall 412 of end member body 408. It will be appreciated, however, that other configurations and/or arrangements could alternately be used without departing from the subject matter of the present disclosure.

Core body 802 also includes a column wall portion 810 that extends from along base wall portion 804 toward a column distal end surface portion 812. In some cases, a securement device 814 (e.g., threaded insert) can be at least partially embedded within column wall portion 810 and accessible from along column distal end surface portion 812, such as to cooperatively engage securement device 464, such as has been described above, for example. A plurality of support wall portions 816 can extend radially outward from along column wall portion 810 toward outer side edges 818. Support wall portions 816 are disposed in peripherally-spaced relation to one another. In some cases, one or more of outer side edges 818 can be dimensioned to cooperatively engage outer side wall portion 412, such as are designated by outer side edges 820 disposed in spaced relation between adjacent ones of outer side edges 818. In such cases, outer side edges 818 are spaced radially inward of the outer side wall portion.

Support wall portions 816 can extend axially from along base wall portion 804 toward end surface portions 822. In some cases, end surface portions 822 can be disposed in an approximately common plane with column distal end surface portion 812. In such cases, one or more of column distal end surface portion 812 and/or end surface portions 822 of support wall portions 816 can be disposed in abutting engagement with end surface portion 428 of end wall portion 418. In some cases, core body 802 can include connecting wall portions 824 that extend radially between adjacent ones of support wall portions 816. If included, connecting wall portions 824 can extend axially from along base wall portion 804 toward end surface portions 826. In some cases, end surface portions 826 can be axially offset from end surface portions 822 such that portions 432P' of end member chamber 432' radially inward of connecting wall portions 824 can be disposed in fluid communication with the remainder of the end member chamber, such as through gaps or spaces 828, for example.

Core body 802 also includes a fluid communication passage 830 extending therethrough. In a preferred arrangement, passage 830 is fluidically isolated from end member chamber 432'. Passage 830 can be constructed in any suitable manner. As one example, core body 802 can include a passage wall (or wall portion) 832 extending from an external communication port 834 formed along base wall portion 804 toward a distal passage end 836. In a preferred arrangement, passage wall 832 can be integrally formed with the other walls and/or wall portions of core body 802. External communication port 834 can be dimensioned to receive or otherwise operatively engage an external fluid transfer line (not shown).

In a preferred arrangement, end member body 408, end member core 800 and end closure 500 are secured together such that passage 540 through end closure body 502 is disposed in fluid communication with passage 830. As discussed above, passage wall portion 542 can extend through opening 482 and into coextensive engagement with passage wall portion 832 such that passage 540 is disposed in fluid communication with passage 830. In such an arrangement, damping orifice 546 can be positioned at least partially within passage 830. As discussed above in connection with passage 472 of end member body 408, a damping orifice 546" could alternately be located on or along passage 830 while remaining in fluid communication with passage 540, such as is shown in FIGS. 8 and 16, for example. In such cases, passage 830 and passage 540 will function as and may be referred to herein as gas damping passages.

Passage 830 is disposed in fluid communication between spring chamber 202 and external communication port 834. Passage 830 is preferably maintained in fluid isolation relative to end member chamber 432' other than through mutual communication with spring chamber 202. It will be appreciated that such fluid isolation of passage 830 can be provided in any suitable manner and/or through any suitable combination of features and/or components. As a non-limiting example, a sealing device 838 can be sealingly disposed on, along and/or otherwise between passage wall portion 832, passage wall portion 542 and/or end wall portion 418 of end member body 408, such as is shown in FIGS. 8 and 11, for example.

Both end member cores 410 and 800 in use together with end member body 408 and end closure 500 provide first and second fluid communication passages that operate in parallel with one another (rather than being connected in series between associated chambers). That is, passages 472 and 830 together with passage 540 extend through the end member assembly in fluid communication between spring chamber 202 and the external communication port. Whereas, passage 518 extends in fluid communication between spring chamber 202 and end member chamber 432 (or 432'). In cases in which passage 518 and passages 540, 472 and/or 830 are configured, constructed and/or otherwise dimensioned for pressurized gas damping, the gas spring and gas damper assembly (e.g., gas spring and gas damper assembly AS1) is capable of providing pressurized gas damping on or along two different passages with each responsive to one of two different frequencies or two different ranges of frequencies. That is, a gas spring and gas damper assembly in accordance with the subject matter of the present disclosure can include a combination of features and/or components suitable for generating pressurized gas damping at two or more predetermined or targeted frequencies or otherwise within two or more predetermined or otherwise targeted ranges of frequencies. For example, it will be appreciated that any combination of spring chambers, one or more end member chambers, one or more external damping chambers and/or one or more elongated gas damping passages can be used.

Additionally, the combination of cross-sectional area and overall length of the elongated gas damping passage can be dimensioned, sized and/or otherwise configured to generate gas flow having sufficient mass and sufficient velocity to achieve the desired level of pressurized gas damping. Generally, a gas spring and gas damper assembly in accordance with the subject matter of the present disclosure can include an elongated gas damping passage that has an overall length that is at least (10) times the maximum dimension (either actual or as a diametric equivalent) of the cross-sectional shape (e.g., the diameter of a circular passage) of the elongated gas damping passage. In a preferred arrangement, the overall length of the elongated gas damping passage will be at least twenty (20) times the maximum dimension of the cross-sectional shape. In some cases, the overall length of the elongated gas damping passage can be at least fifty (50) times the maximum dimension of the cross-sectional shape of the elongated gas damping passage.

It will be appreciated that the aforementioned maximum dimension of the cross-sectional shape of the elongated gas damping passage can be either actual or a theoretical equivalent dimension. For example, an actual diameter of a circular passage, a major diameter of an elliptical passage or a height or width of a rectangular passage could be used. For non-circular and/or irregularly-shaped passages, a theoretical equivalent maximum dimension could be used.

Optionally, gas spring and gas damper assembly AS1 can include a travel-limiting assembly 600 that is operatively connected on, along and/or otherwise between end member assembly 300 and end member assembly 400. It will be appreciated that such a travel-limiting assembly can be operatively connected therebetween in any suitable manner (either directly or indirectly) using any combination of features, components and/or devices. Travel-limiting assembly 600 is operative to provide resistance to the extension of gas spring and gas damper assembly AS1 as the gas spring and gas damper assembly is extended beyond a predetermined height, such as a full rebound height, for example. In a preferred arrangement, the travel-limiting assembly can take the form of a construction that provides minimal resistance to extension during normal use in operation but substantially inhibits extension of the gas spring and gas damper assembly beyond the predetermined extended height.

As one example of a suitable construction, travel-limiting assembly 600 can include a flexible annular member 602 that is used as the working device that compresses or otherwise collapses within spring chamber 202 during jounce motion while substantially restricting rebound motion to a predetermined maximum travel distance. It will be appreciated that flexible annular member 602 can be of any suitable size, shape, construction and/or configuration. In a preferred arrangement, flexible annular member 602 can have an overall construction substantially similar to a type and kind of flexible spring member commonly referred to as a convoluted or bellows-type construction, and it will be appreciated that any suitable type or kind of convoluted spring construction can be used. As such, in some cases, the flexible annular member can, optionally, include zero or more girdle wall portions disposed on or along flexible annular member 602. In cases in which one or more girdle wall portions are included, the one or more girdle portions can be spaced apart from the ends of the flexible annular member to form a corresponding number of two or more convoluted wall portions.

As a non-limiting example, flexible annular member 602 can include a flexible wall 604 that is at least partially formed from one or more layers or plies of elastomeric material (e.g., natural rubber, synthetic rubber and/or thermoplastic elastomer) and can optionally include one or more plies or layers of filament reinforcing material. Flexible wall 604 is shown extending in a longitudinal direction between opposing ends 606 and 608. In some cases, flexible wall 604 can, optionally, include a mounting bead disposed along either one or both of ends 606 and 608. In the arrangement shown in FIGS. 6-8, 10 and 16, flexible wall 604 includes mounting beads 610 and 612 respectively disposed along ends 606 and 608. In some cases, the mounting beads can, optionally, include a reinforcing device, such as an endless, annular bead core 614, for example.

In the exemplary arrangement shown in FIGS. 6-8, 10 and 16, flexible wall 604 of flexible annular member 602, optionally, includes a girdle wall portion 616 disposed approximately midway along flexible wall 604 between ends 606 and 608. In such a construction, a convoluted wall portion 618 extends between girdle wall portion 616 and mounting bead 610, and a convoluted wall portion 620 extends between the girdle wall portion and mounting bead 612. In some cases, girdle wall portion 616 can, optionally, include a reinforcing device, such as an endless, annular girdle hoop 622, for example. If included, girdle hoop 622 can be at least partially embedded within girdle wall portion 616 of flexible wall 604, and can function to retard or otherwise inhibit radially-outward expansion of the flexible wall during use.

As indicated above, flexible wall 604 of flexible annular member 602 can be formed in any suitable manner and from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 604 can include an inner surface 624 and an outer surface 626 that each extend longitudinally along the flexible wall. Inner surface 624 can at least partially define an interior chamber 628 of the flexible annular member 602 that is disposed inwardly of the flexible wall. In a preferred arrangement, flexible wall 604 can include one or more layers or reinforcing plies disposed between inner and outer surfaces 624 and 626. The one or more reinforcing plies can be of any suitable construction and/or configuration. For example, the one or more reinforcing plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between the various layers could result during and/or after vulcanization, for example.

Figure 6:
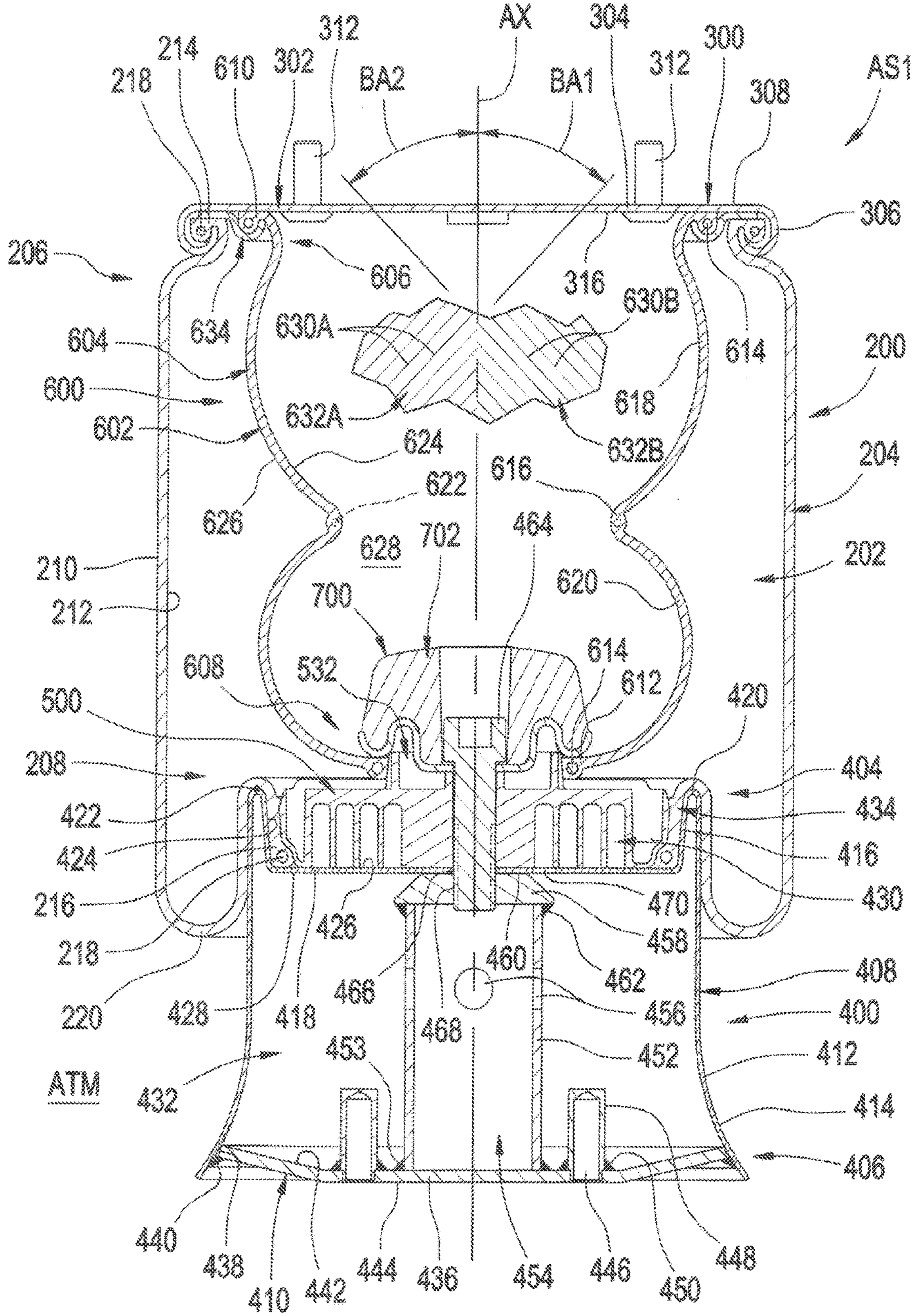
FIG. 6 is a cross-sectional side view of the exemplary gas spring and gas damper assembly shown in FIGS. 2-5 taken from along line 6-6 in FIG. 4.

Additionally, it will be appreciated that the one or more lengths of filament material, if provided, can be oriented in any suitable manner. As one example, flexible wall 604 is shown in FIG. 4 as including a plurality of filament segments 630A disposed at one bias angle BA1 and at least partially forming one reinforcing layer or ply 632A. Flexible wall 604 also includes a plurality of filament segments 630B disposed at another bias angle BA2 and at least partially forming another reinforcing layer or ply 632B. It will be appreciated that any suitable bias angles can be used, such as bias angles within a range of from approximately 3 degrees to approximately 87 degrees, for example. In some cases, the filament segments can be disposed at approximately the same bias angle but oriented in the opposing direction, such as is represented in FIG. 6 by reference dimensions BA1 and BA2, for example.

In some cases, travel-limiting assembly 600 can extend and collapse without generating any substantial resistance to motion as gas spring and gas damper assembly AS1 is axially displaced during use toward, from and/or otherwise between a full jounce condition (i.e., fully compressed) and a full rebound condition (i.e., fully extended). Flexible annular member 602 is axially coextensive with flexible annular member 200. Upon reaching full rebound height, flexible wall 604 of flexible annular member 602 becomes tensioned between end member assembly 300 and end member assembly 400 (or end closure 500, which is secured to end member assembly 400). Though flexible wall 604 is at least partially formed from elastomeric material, the flexible wall and any filament segments embedded therein (e.g., filament segments 630A and 630B of reinforcing plies 632A and 632B) eventually reach a point of maximum elongation. In such a condition, flexible wall 604 becomes substantially inextensible in the axial direction and thereby limits extension of gas spring and gas damper assembly AS1 beyond the desired or otherwise predetermined maximum rebound height.

That is, it will be appreciated that flexible annular member 200 will have a maximum extensible length associated with the dimensions and construction thereof. As such, flexible annular member 200 be capable of undergoing a maximum extension under full rebound conditions. Similarly, flexible annular member 602 will have a maximum extensible length associated with the dimensions and construction thereof. In a preferred arrangement, the maximum extensible length of flexible annular member 602 is less than the maximum extensible length of flexible annular member 200. Upon reaching a condition in which flexible annular member 602 is substantially inextensible in the axial direction, flexible annular member 200 has a greater maximum extensible length and, thus, is protected from overextension by flexible annular member 602 reaching the corresponding maximum extensible length thereof. As gas spring and gas damper assembly AS1 is compressed toward the full jounce height, convoluted wall portions 620 and 622 of flexible wall 604 collapse onto one another within spring chamber 202. In such an arrangement, flexible annular member 602 remains contained within spring chamber 202, such as without flexible wall 604 substantially contacting flexible spring member 200, for example.

It will be appreciated that mounting beads 610 and 612 can be secured on, along and/or otherwise between end member assembly 300 and end member assembly 400 or end closure assembly 500, for example. As one non-limiting example, mounting bead 610 can be operatively connected with a mounting ring 634 that is secured on or along end member assembly 300 in a suitable manner. Mounting ring 634 can take the form of an endless annular ring that extends peripherally about axis AX.

Flexible annular member 602 can be secured on or along end member assembly 400 in any suitable manner, such as through attachment to end closure assembly 500, for example. In the arrangement shown in FIGS. 6-8 and 16, for example, mounting bead 612 is received on or along mounting wall portion 526 of end closure wall 504. An end surface (or end surface portion) 650 of mounting bead 612 is disposed on or along outer surface 534 with the mounting bead received between bead retaining wall 536 and surface portion 506 such that mounting bead 612 is secured on or along mounting wall portion 526 in a somewhat conventional manner. That is, mounting bead 612 is disposed along outer surface portions 534A and 534B beneath bead retaining wall portions 536A and 536B. However, conventional assemblies include a substantially fluid-tight seal being formed between the mounting bead and the mounting wall portion substantially-entirely around the periphery of outer surface 534. The subject construction differs from conventional assemblies in that mounting bead 612 bridges across notches 538. As such, mounting bead 612 extends peripherally between outer surface portions 534A and 534B such that passages are defined between the mounting bead and the mounting wall portion at least through notches 538 that permit fluid communication between end closure recess 532 and spring chamber 202, which passages and fluid communication is represented in FIG. 10 by arrow 652.

To eliminate inadvertent or otherwise undesirable contact between opposing portions or components thereof, a gas spring and gas damper assembly can include a jounce bumper assembly disposed within the spring chamber of the gas spring and gas damper assembly. The jounce bumper assembly can be supported on or along either of the end member assemblies of the gas spring and gas damper assembly. As is well understood in the art, the jounce bumper prevents or otherwise at least substantially inhibits opposing portions of the gas spring and gas damper assembly (or the suspension system associated therewith) from directly impacting one another. Thus, during jounce motion, an opposing component will contact the jounce bumper rather than impacting other components on or near which the jounce bumper is mounted.

Gas spring assembly AS1 includes a jounce bumper assembly 700 that is disposed within spring chamber 202. Jounce bumper assembly 700 includes a bumper body 702 and a bumper base plate 704. Jounce bumper assembly 700 can be supported on or along any combination of one or more of end member assembly 300, end member assembly 400 and/or end closure assembly 500. In a preferred arrangement, jounce bumper assembly 700 can be supported on end closure assembly 500, such as is shown in FIGS. 6-8, 10 and 16, for example. In one exemplary arrangement, securement device 464 can extend through jounce bumper assembly 700 to thereby retain the jounce bumper assembly in abutting engagement on or along an inner support wall portion 548 of end closure wall 504, for example.

Bumper body 702 can be formed from any suitable material or combination of materials and can be of any suitable size, shape, configuration and/or construction, such as may be preferred for use in a particular application. For example, bumper body 702 can be formed from a rigid thermoplastic, a thermoplastic elastomer, a natural rubber compound, a synthetic rubber compound, or any combination of these and/or other polymeric materials. Bumper body 702 is shown as including end surfaces (or end surface portions) 706 and 708 that are spaced apart from one another in an axial direction. An outer side surface (or surface portion) 710 can extend peripherally around the jounce bumper body. In some cases, bumper body 702 can include an inner side surface (or surface portion) 712 that at least partially defines a passage 714 extending through the bumper body. In the exemplary embodiment shown, end surface portion 706 is somewhat curved or otherwise crowned and forms an outermost extent or contact surface for the jounce bumper assembly. End surface portion 708 substantially conforms to the configuration of bumper base plate 704 with outer side surface portion 710 commonly being at least partially tapered or frustoconical in shape. It will be appreciated, however, that the exterior shape and configuration of bumper body 702 is merely exemplary and that surfaces of any suitable number, size and/or shape can alternately be used.

Bumper base plate 704 includes a plate surface (or surface portion) 716 on or along which bumper body 702 is supported and a plate surface (or surface portion) 718 facing opposite plate surface 716. Bumper body 702 can be secured on or along plate surface 716 of bumper base plate 704 in any suitable manner, such as, for example, by using any combination of any one or more of mechanical fasteners or interengaging features, an adhesive substance or joint, molding or overmolding processes, vulcanizing or other cured-material joint to permanently attach (i.e., inseparable without damage, destruction or material alteration of at least one of the component parts) bumper body 702 on or along bumper base plate 704.

Bumper base plate 704 includes a base wall portion 720 that is approximately planar and includes a hole or opening 722 extending therethrough. In such an arrangement, securement device 464 can extend through passage 714 in bumper body 702 and hole 722 in bumper base plate 704 to secure jounce bumper assembly 700 on or along inner support wall portion 548 of end closure body 502, such as has been discussed above. Bumper base plate 704 also includes an outer wall portion 724 disposed radially outward of base wall portion 720 that extends toward an outer peripheral edge 726. Outer wall portion 724 can include a curved cross-sectional shape or profile that extends peripherally around bumper base plate 704. In an installed condition, outer wall portion 724 can, optionally, assist in retaining end 208 of flexible wall 204 on or along end closure body 502. For example, outer wall portion 724 can abuttingly engage inner surface 212 of the flexible wall along mounting bead 216 to compress or otherwise urge the mounting bead toward surface portion 506 such that mounting bead 216 is retained on or along mounting wall portion 526.

As discussed above, fluid communication between end closure recess 532 and spring chamber 202 is provided by passages 652 through notches 538 even though mounting bead 216 may sealingly engage outer surface portions 534A and 534B of mounting wall portion 526. However, it will be appreciated that abutting engagement of outer wall portion 724 with inner surface 212 peripherally around jounce bumper assembly 700 can form a seal or other interface therebetween that may limit fluid communication between end closure recess 532 and interior chamber 628 of flexible annular member 602. In a preferred arrangement, interior chamber 628 is disposed in fluid communication with spring chamber 202 such that the interior chamber and the spring chamber fluidically function or otherwise act as a substantially-contiguous volume under at least static conditions of use. In some cases, pressurized gas flow through passages 730 and 732 together with notches 538, as represented by arrows 652 and 654, can provide some restriction to flow and, thus, some amount of pressurized gas damping during dynamic use in operation of gas spring and gas damper assembly AS1.

It will be appreciated that such fluid communication can be achieved in any suitable manner. As one non-limiting example, bumper base plate 704 can include an intermediate wall portion 728 disposed between base wall portion 720 and outer wall portion 724. Intermediate wall portion 728 can have a curved cross-sectional shape or profile oriented opposite the curved cross-sectional profile of outer wall portion 724. In such a configuration, intermediate wall portion 728 extends peripherally around bumper base plate 704 and can contribute added volume to end closure recess 532 between end closure body 502 and bumper base plate 704. Bumper body 702 can include a passage 730 extending therethrough and bumper base plate 704 can include a hole or passage 732 extending therethrough in fluid communication with passage 730. In a preferred arrangement, passages 730 and 732 can be offset radially outward of axis AX such that at least passage 732 extends through intermediate wall portion 728, as is shown in FIGS. 7, 8, 10 and 16, for example. In such an arrangement, fluid communication between end closure recess 532 and interior chamber 628 occurs through passages 730 and 732, as is represented in FIGS. 7, 8, 10 and 16 by arrow 654. As such, spring chamber 202 and interior chamber 628 are disposed in fluid communication with one another through end closure recess together with passages 652 and 654.

In some cases, bumper base plate 704 can include an inner side wall portion 734 disposed between base wall portion 720 and outer wall portion 724. Inner side wall portion 734 can extend between and operatively connect base wall portion 720 with intermediate wall portion 728, if included. Inner side wall portion 734 can have any suitable linear or curvilinear cross-sectional shape or profile and can be oriented to extend in a generally axial direction. In some cases, inner side wall portion can at least partially form a cup or bowl-shaped section 736 disposed radially inward of outer wall portion 724. In some cases, the bumper body can be disposed within the cup-shaped section and abuttingly engage the inner side wall portion under compression associated with full jounce conditions. In other cases, bumper body 702 can be disposed along bumper base plate 704 such that end surface 708 of the bumper body extends along the bumper base plate from along at least some of base wall portion 720 along and across at least some of outer wall portion 724, such as to outer peripheral edge 726, for example.

In accordance with the subject matter of the present disclosure, mounting member 900 is dimensioned to structurally support end member assembly 400 on or along lower suspension component LSC as well as fluidically interconnect one or more chambers of gas spring and gas damper assembly AS1 with suspension component volume EXT. In such an arrangement, forces and/or loads associated with gas spring and gas damper assembly AS1 are carried or otherwise transferred to, from and/or between the gas spring and gas damper assembly and the lower suspension component LSC through mounting member 900. Additionally, such an arrangement permits provides for fluid communication between one or more chambers of the gas spring and gas damper assembly and the suspension component volume through the mounting member.

It will be appreciated that end member assembly 400 can be operatively connected to mounting member 900 in any suitable manner. As one non-limiting example, mounting member 900 can include a mounting flange 902 dimensioned for securement on or along end member assembly 400. Mounting member 900 can also include a mounting flange 904 disposed in spaced relation to mounting flange 902 and dimensioned for securement on or along lower suspension component LSC. Mounting member 900 also includes a member body wall 906 that extends between and rigidly connects mounting flanges 902 and 904. Mounting member 900 differs from conventional supports and brackets in that member body wall 906 at least partially defines a mounting member cavity 908 disposed within the mounting member. In some cases, mounting member cavity 908 can include an open end 910 on or along mounting flange 902.

Additionally, or in the alternative, mounting member cavity 908 can include an open end 912 on or along mounting flange 904.

In some cases, one or more gas transfer lines or other gas transfer passages can extend through the mounting member cavity. In the arrangement shown and described in connection with FIGS. 2, 3, 7 and 8, for example, a gas transfer line 914 is at least partially disposed within mounting member cavity 908. In some cases, the one of more gas transfer lines can project outwardly through the open end of either or both of the mounting flanges. As a non-limiting example, gas transfer line 914 includes a first end 916 projecting outward from along mounting flange 902 and disposed in fluid communication with gas spring and damper assembly AS1, such as through a substantially fluid-tight connection on or along external communication port 476 or 834, for example. Additionally, or in the alternative, gas transfer line 914 can include a second end 918 projecting outward from along mounting flange 904 and disposed in fluid communication with suspension component volume EXT in a suitable manner. In some cases, the substantially fluid-tight connection on or along first end 916 and/or second end 918 can include a sealing device 920 sealingly disposed along gas transfer line 914.

In accordance with the subject matter of the present disclosure, extending gas transfer line 914 through mounting member cavity 908 guards or otherwise protects the gas transfer line, such as from impacts from road debris and/or exposure to environmental degradation. Additionally, such a construction extends damping passage 472 and/or 830 into fluid communication with an additional volume external to gas spring and gas damper assembly AS1, such as suspension component volume EXT, for example.

Additionally, or in the alternative, mounting member 1000 in accordance with the subject matter of the present disclosure can be dimensioned to structurally support end member assembly 400 on or along lower suspension component LSC as well as fluidically interconnect one or more chambers of gas spring and gas damper assembly AS1 with suspension component volume EXT. Again, in such an arrangement, forces and/or loads associated with gas spring and gas damper assembly AS1 are carried or otherwise transferred to, from and/or between the gas spring and gas damper assembly and the lower suspension component LSC through mounting member 1000. Additionally, such an arrangement permits provides for fluid communication between one or more chambers of the gas spring and gas damper assembly and the suspension component volume through the mounting member.

It will be appreciated that end member assembly 400 can be operatively connected to mounting member 1000 in any suitable manner. As one non-limiting example, mounting member 1000 can include a mounting flange 1002 dimensioned for securement on or along end member assembly 400. Mounting member 1000 can also include a mounting flange 1004 disposed in spaced relation to mounting flange 1002 and dimensioned for securement on or along lower suspension component LSC. Mounting member 1000 also includes a member body wall 1006 that extends between and rigidly connects mounting flanges 1002 and 1004.

Mounting member 1000 differs from mounting member 900 in that mounting member 1000 includes an elongated mounting member passage 1008 extending therethrough in place of mounting cavity 908 and gas transfer line 914. That is, elongated mounting member passage 1008 is dimensioned for fluid communication to, from and/or otherwise between one or more passages or connection ports of end member assembly 400 and suspension component volume EXT without utilizing a separate gas transfer line or tube to connect therebetween, such as is shown and described in connection with mounting member 900, for example. In such an arrangement, elongated mounting member passage 1008 can extend from a first passage end 1010 disposed along an end of the mounting member toward mounting flange 1002 through member body wall 1006 to a second passage end 1012 disposed along an end of the mounting member toward mounting flange 1004. In such an arrangement, mounting member 1000 can be sealingly engaged with end member assembly 400, such as by way of a sealing device 1014 operatively disposed therebetween, for example. Additionally, or in the alternative, mounting member 1000 can be sealingly engaged with lower suspension component LSC, such as by way of a sealing device 1016 operatively disposed therebetween, for example.

To aid in differentiating between mounting member cavity 908 and/or other chambers and cavities of known mounting structures, the passage through gas transfer line 914 and elongated mounting member passage 1008 preferably have an overall length that is at least (10) times the maximum dimension (either actual or as a diametric equivalent) of the cross-sectional shape (e.g., the diameter of a circular passage) thereof. In some cases, the overall length of the passage can be at least twenty (20) times the maximum dimension of the cross-sectional shape. In still other cases, the overall length of the elongated gas damping passage can be at least fifty (50) times the maximum dimension of the cross-sectional shape of the passage.

It will be appreciated that the aforementioned maximum dimension of the cross-sectional shape of the passage can be either actual or a theoretical equivalent dimension. For example, an actual diameter of a circular passage, a major diameter of an elliptical passage or a height or width of a rectangular passage could be used. For non-circular and/or irregularly-shaped passages, a theoretical equivalent maximum dimension could be used.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms “transverse,” and the like, are to be broadly interpreted. As such, the terms “transverse,” and the like, can include a wide range of relative angular orientations that include, but are not limited to, an approximately perpendicular angular orientation. Also, the terms “circumferential,” “circumferentially,” and the like, are to be broadly interpreted and can include, but are not limited to circular shapes and/or configurations. In this regard, the terms “circumferential,” “circumferentially,” and the like, can be synonymous with terms such as “peripheral,” “peripherally,”and the like.

It is to be recognized and appreciated that terms such as “can”, “may”, “might” and the like are to be interpreted as being permissive rather than required. As such, any reference to items with which terms such as “can”, “may”, “might” and the like are used shall be interpreted as being optional rather than required by the subject matter of the present disclosure unless otherwise specifically set forth herein.

Furthermore, the phrase “flowed-material joint” and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An assembly comprising:

a gas spring and gas damper assembly including:

a flexible spring member having a longitudinal axis and extending peripherally about said longitudinal axis between a first end and a second end spaced longitudinally from said first end such that a spring chamber is at least partially defined therebetween;

a first end member assembly secured across said first end of said flexible spring member such that a substantially fluid-tight connection is formed therebetween; and, a second end member assembly secured across said second end of said flexible spring member such that a substantially fluid-tight connection is formed therebetween, said second end member assembly at least partially defining an end member chamber, said second end member assembly including a first elongated gas damping passage in fluid communication between said spring chamber and said end member chamber, said first elongated damping passage having a maximum cross-sectional dimension taken transverse thereto and having a passage overall length at least ten (10) times said maximum cross-sectional dimension, and said second end member assembly including a second passage in fluid communication between said spring chamber and an external connection port with said second passage and said external connection port fluidically isolated from said end member chamber; and, a mounting member including a first member end and a second member end, said first member end of said mounting member operatively attached to said second end member assembly, said second member end dimensioned for securement to an associated suspension component including an associated suspension component volume, said mounting member including an elongated mounting member passage extending therethrough from a first member passage end accessible from along said first member end to a second member passage end accessible from along said second member end, said mounting member sealingly engaged with said second end member assembly such that a substantially fluid-tight connection is formed between at least said first member passage end of said elongated mounting member passage and said external connection port of said second end member assembly whereby said spring chamber is in fluid communication with the associated suspension component volume through said second passage of said second end member assembly and said elongated mounting member passage of said mounting member.

2. An assembly according to claim 1, wherein said first elongated gas damping passage is dimensioned to provide gas damping within a range of from approximately 8 Hz to approximately 15 Hz.

3. An assembly according to claim 1, wherein said first elongated gas damping passage has a spiral configuration disposed in a plane oriented transverse to said longitudinal axis with a first passage end disposed in fluid communication with said spring chamber and a second passage end disposed in fluid communication with said end member chamber.

4. An assembly according to claim 1, wherein said second passage is a second gas damping passage and extends through said end member chamber in fluid communication between said spring chamber and said external connection port.

5. An assembly according to claim 1, wherein said second passage is a second gas damping passage having a maximum cross-sectional dimension taken transverse thereto and having a passage overall length at least ten (10) times said maximum cross-sectional dimension.

6. An assembly according to claim 1, wherein said second passage is a second gas damping passage having a nominal passage cross-sectional dimension and a gas damping orifice disposed in fluid communication along said second gas damping passage with said gas damping orifice having an orifice cross-sectional dimension that is less than said passage cross-sectional dimension and operative to generate pressurized gas damping along at least said second gas damping passage.

7. An assembly according to claim 6, wherein said gas damping orifice is dimensioned to generate pressurized gas damping within a range of from approximately 0.5 Hz to approximately 2 Hz.

8. An assembly according to claim 1, wherein said second end member assembly includes a passage wall portion at least partially defining said second passage with said passage wall portion extending axially through said end member chamber.

9. An assembly according to claim 1, wherein said elongated mounting member passage is an elongated mounting member gas damping passage having a maximum cross-sectional dimension taken transverse thereto and having a passage overall length at least ten (10) times said maximum cross-sectional dimension.

10. An assembly according to claim 1, wherein said mounting member includes a mounting member wall integrally defining said elongated mounting member passage from said first member passage end through said mounting member to said second member passage end.

11. An assembly comprising:

a gas spring and gas damper assembly including:

a flexible spring member having a longitudinal axis and extending peripherally about said longitudinal axis between a first end and a second end spaced longitudinally from said first end such that a spring chamber is at least partially defined therebetween;

a first end member assembly secured across said first end of said flexible spring member such that a substantially fluid-tight connection is formed therebetween; and, a second end member assembly secured across said second end of said flexible spring member such that a substantially fluid-tight connection is formed therebetween, said second end member assembly at least partially defining an end member chamber, said second end member assembly including a first passage in fluid communication between said spring chamber and said end member chamber, and said second end member assembly including a second passage in fluid communication between said spring chamber and an external connection port with said second passage and said external connection port fluidically isolated from said end member chamber; and, a mounting member including a first member end and a second member end, said first member end of said mounting member operatively attached to said second end member assembly, said second member end dimensioned for securement to an associated suspension component including an associated suspension component volume, said mounting member including an elongated mounting member gas damping passage extending therethrough from a first member passage end accessible from along said first member end to a second member passage end accessible from along said second member end, said elongated mounting member gas damping passage having a nominal passage cross-sectional dimension with a gas damping orifice supported on said mounting member in fluid communication along said elongated mounting member gas damping passage, said mounting member sealingly engaged with said second end member assembly such that a substantially fluid-tight connection is formed between at least said first member passage end of said elongated mounting member gas damping passage and said external connection port of said second end member assembly whereby said spring chamber is in fluid communication with the associated suspension component volume through said second passage of said second end member assembly and said elongated mounting member gas damping passage of said mounting member, said gas damping orifice having an orifice cross-sectional dimension that is less than said passage cross-sectional dimension such that said gas damping orifice is operative to generate pressurized gas damping along at least said elongated mounting member gas damping passage.

12. An assembly according to claim 11, wherein said gas damping orifice is dimensioned to provide gas damping within a range of from approximately 0.5 Hz to approximately 2 Hz.

13. An assembly according to claim 11, wherein said second member end of said mounting member is adapted to sealingly engage the associated suspension component such that a substantially fluid-tight seal can be formed therebetween.

14. An assembly comprising:

a gas spring and gas damper assembly including:

a flexible spring member having a longitudinal axis and extending peripherally about said longitudinal axis between a first end and a second end spaced longitudinally from said first end such that a spring chamber is at least partially defined therebetween;

a first end member assembly secured across said first end of said flexible spring member such that a substantially fluid-tight connection is formed therebetween; and, a second end member assembly secured across said second end of said flexible spring member and including an end closure operatively connecting said second end of said flexible spring member on said second end member assembly such that a substantially fluid-tight connection is formed therebetween, said second end member assembly at least partially defining an end member chamber, said end closure of said second end member assembly at least partially defining a first passage in fluid communication between said spring chamber and said end member chamber, and said second end member assembly including a second passage in fluid communication between said spring chamber and an external connection port with said second passage and said external connection port fluidically isolated from said end member chamber; and, a mounting member including a first member end and a second member end, said first member end of said mounting member operatively attached to said second end member assembly, said second member end dimensioned for securement to an associated suspension component including an associated suspension component volume, said mounting member including an elongated mounting member passage extending therethrough from a first member passage end accessible from along said first member end to a second member passage end accessible from along said second member end, said mounting member sealingly engaged with said second end member assembly such that a substantially fluid-tight connection is formed between at least said first member passage end of said elongated mounting member passage and said external connection port of said second end member assembly whereby said spring chamber is in fluid communication with the associated suspension component volume through said second passage of said second end member assembly and said elongated mounting member passage of said mounting member.

15. An assembly according to claim 14, wherein said end closure includes an end closure port in fluid communication with said spring chamber and said second passage.

16. An assembly according to claim 15, wherein said end closure includes an end surface portion and a connection wall portion at least partially defining said end closure port, said connection wall portion projecting outwardly beyond said end surface portion of said end closure.

17. An assembly according to claim 16, wherein said second end member assembly includes a passage wall portion at least partially defining said second passage with said connection wall portion axially coextensive with said passage wall portion such that said end closure port is disposed in fluid communication with said second passage.

18. An assembly according to claim 17, wherein said second end member assembly includes a sealing device compressively disposed between said connection wall portion and said passage wall portion.

19. An assembly according to claim 16, wherein said connection wall portion includes a distal end portion at least partially defining a gas damping orifice.

20. A suspension system comprising;

a suspension component including a suspension component volume; and, at least one assembly according to claim 14 with said mounting member secured to said suspension component and said second member end of said elongated mounting member passage disposed in fluid communication with said suspension component volume.

* * * * *